US012307900B1

(12) United States Patent
Semple et al.

(10) Patent No.: US 12,307,900 B1
(45) Date of Patent: May 20, 2025

(54) DRIVING SIMULATIONS WITH SIMULATED AGENT INTERACTIONS

(71) Applicant: Zoox, Inc., Foster City, CA (US)

(72) Inventors: Tod Cameron Semple, Woodside, CA (US); Maxwell Chandler Robinson, Burlingame, CA (US); Chonhyon Park, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 222 days.

(21) Appl. No.: 17/989,598

(22) Filed: Nov. 17, 2022

(51) Int. Cl.
*G08G 1/16* (2006.01)

(52) U.S. Cl.
CPC ............. *G08G 1/166* (2013.01); *G08G 1/164* (2013.01); *G08G 1/167* (2013.01)

(58) Field of Classification Search
CPC ......... G08G 1/166; G08G 1/164; G08G 1/167
See application file for complete search history.

(56) References Cited

U.S. PATENT DOCUMENTS

2022/0266859 A1* 8/2022 Semple ................ G07C 5/0841
2022/0269836 A1* 8/2022 Mukundan ...... B60W 60/00276

* cited by examiner

*Primary Examiner* — Andrew J Cromer
(74) *Attorney, Agent, or Firm* — Lee & Hayes, P.C.

(57) ABSTRACT

Techniques are discussed herein for executing simulations including multiple simulated agents that can interact with each other with a reaction delay. At a first time point, a first trajectory of the first simulated agent associated with a first time point in the driving simulation can be determined, and stored in a first buffer component. At a second time point in the driving simulation after the first time point, the first trajectory of the first simulated agent associated with the first time point can be retrieved. A time period between the first time point and the second time point is a reaction delay. A second trajectory for controlling the second simulated agent can be determined based at least in part on the first trajectory of the first simulated agent associated with the first time point. The second simulated agent is controlled to move along the second trajectory.

20 Claims, 9 Drawing Sheets

DRIVING SIMULATIONS WITH SIMULATED AGENT INTERACTIONS

BACKGROUND

Simulation systems are capable of executing driving simulations where vehicles and agents are making split-second decisions to respond to myriad events and scenarios, including vehicle reactions to dynamic objects operating in an environment of the vehicle. In some examples, simulations can be used to simulate driving scenarios that may be otherwise prohibitive to test in real-world environments for example, due to safety concerns, limitations on time, repeatability, etc. Moreover, a simulation system can execute driving simulations to test and improve agent controllers to control the simulated agents. Moreover, the simulation system can execute driving simulations to test and improve the performance of vehicle control systems with respect to passenger safety, vehicle decision-making, sensor data analysis, route optimization, and the like. However, driving simulations that accurately reflect real-world scenarios may be difficult and expensive to create and execute. Additionally, the execution of driving simulations may involve executing multiple different interacting systems and components, including simulated agents and other objects in the simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
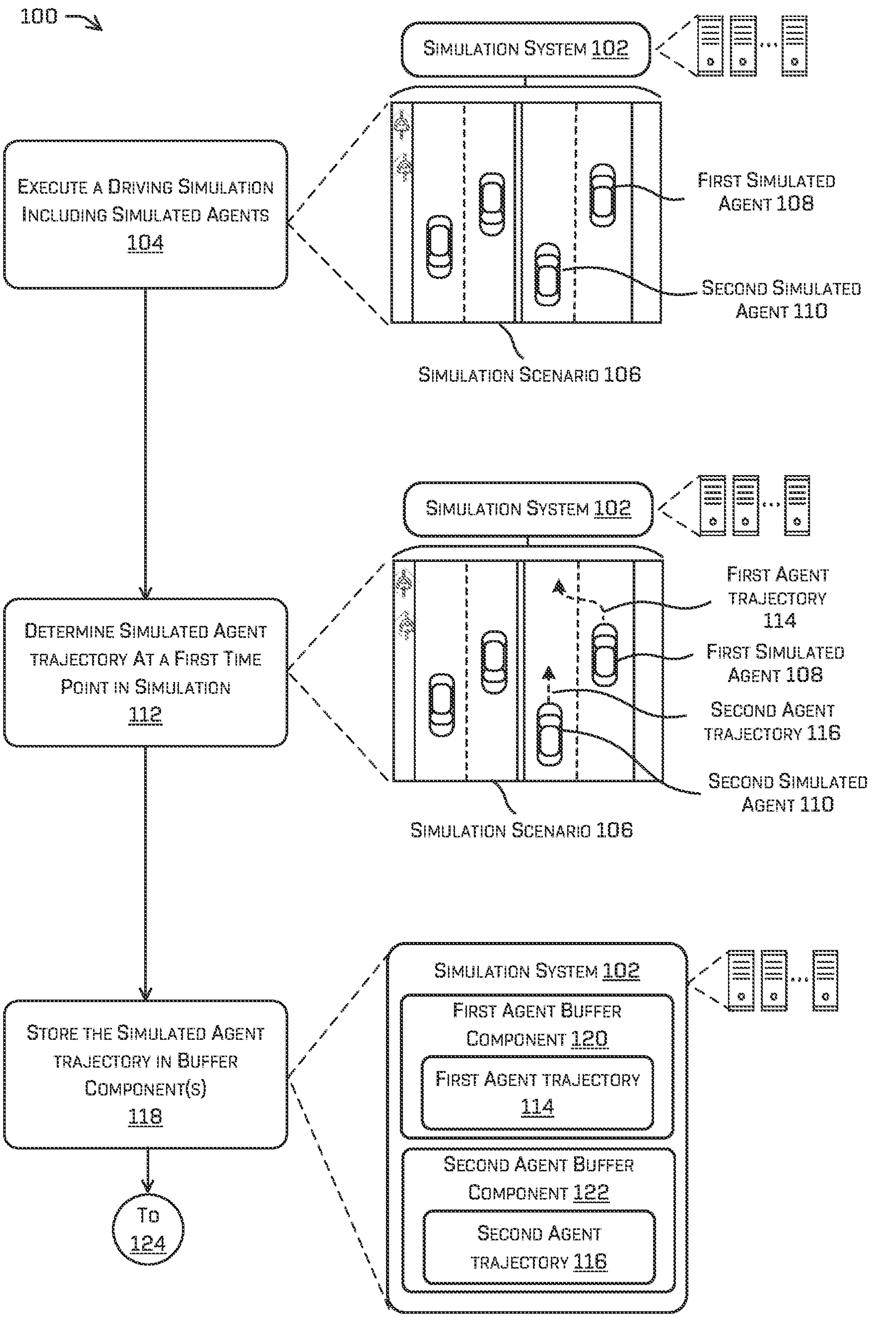
FIG. 1A and FIG. 1B depict an example process of executing driving simulations, including multiple simulated agents that can interact with each other during the simulation.

During a simulation, a simulated agent can interact with other simulated agents. In some cases, the simulated agents in the simulation can interact with each other instantaneously. However, in real-life driving scenarios, there may be reaction delays when a driver of a vehicle reacts to the movements of other vehicles or objects in the environment. In some instances, the driver may be distracted for a short time when driving a vehicle. For example, the driver may look in the back seat or look down for a second and may not react to another vehicle's movement immediately. Moreover, there may be reaction delays, caused by the reaction time of the driver or the vehicle itself, when a driver responds to a driving situation. For example, when the driver decides to decelerate, there may be a reaction time delay as the driver moves her foot from the gas paddle to the brake paddle. Furthermore, reaction delays can include mechanical delays caused by the vehicle. For example, when the driver turns the steering wheel, the vehicle may have a mechanical delay between the driver's action and the actual turning movement of the vehicle. Though the simulation can simulate an environment in which multiple simulated agents traverse, without a delay in interactions between simulated agents, the simulation may be less realistic. Therefore, adding a reaction delay when executing the driving simulation for interactions between multiple simulated agents can make the simulation more humanlike and realistic.

A simulated driving scenario can include any number of simulated objects/agents such as static objects (e.g., buildings, bridges, signs, etc.) and/or dynamic simulated agents such as other vehicles (e.g., cars, trucks, trains, etc.), pedestrians, bicyclists, or the like. Throughout this disclosure, simulated agents can refer to static or dynamic objects such as vehicles, bicycles, pedestrians, animals, etc. In some examples, the simulated agent can be a smart agent (which is a simulated agent that is controlled by an object controller configured to react to varied situations and scenarios). Additional details regarding smart agents can be found in U.S. patent application Ser. No. 17/411,760, filed on Aug. 25, 2021, and entitled "Parameterized Object Controllers In Driving Simulations," the entire contents of which are incorporated herein by reference for all purposes.

This application relates to techniques for executing driving simulations, during which simulated agents are controlled with delays in reaction to other simulated agents. As described in various examples below, a simulation system may perform simulations. The simulation system may execute one or more agent controllers to determine the movements, predictions, trajectories, reactions, interactions, delays, or the like associated with the simulated agents during the simulations. In some examples, the simulation system may determine one or more trajectories to control a simulated agent during a simulation, based on various data such as the object type of the simulated agent, location data, map data, and/or other characteristics of the simulated scenario. In some examples, an object controller may determine a trajectory for each agent at each tick (e.g., processing cycle or periodically within the simulation). In some examples, the agent controller may generate multiple trajectories at each tick, e.g., a primary trajectory and a secondary that is used by Collision Avoidance System (CAS). The simulation system may aggregate the simulation data to improve the simulation, for example, to make the simulation more realistic. The simulation system may be used to validate the agent controllers, and simulated agent control methods, and can re-execute the simulations with improved simulation strategies.

As used herein, an agent controller may include a component and/or model configured to control simulated agents (e.g., smart simulated agents) during a simulation. Various techniques described herein include performing simulations by a simulation system configured to execute one or more agent controllers to control the behaviors of the simulated agents within the simulation. In some examples, the agent controllers may be implemented as machine-learned models.

The agent controller can determine navigation decisions, movements, and/or other behaviors for a simulated agent while traversing a simulated environment. For instance, the agent controller may determine velocities at which a simulated agent moves during a simulation, its acceleration and/or deceleration rates, its following distances, its lateral acceleration rates while turning, its stopping locations relative to stop signs and crosswalks, etc. The agent controller also may determine how the simulated agent performs route planning, whether or not the simulated agent will use bike lanes when determining a route, whether the simulated agent will use lane splitting and/or lane sharing, the desired cruising speed of the simulated agent relative to the speed limit (based on simulated agent type), the maximum possible speed and acceleration of the simulated agent (based on simulated agent type), the desired distances of the simulated agent from other simulated agents in the simulated environment (based on simulated agent type).

Additional details regarding controlling simulated agents are described in U.S. patent application Ser. No. 17/411,760, filed on Aug. 25, 2021, and entitled "Parameterized Object Controllers in Driving Simulations," the entire contents of which are incorporated herein by reference for all purposes.

The simulations generated and performed by the simulation system may include log-based simulations and/or synthetic simulations. For instance, the simulation system may generate simulations utilizing techniques such as those described in U.S. patent application Ser. No. 16/376,842, filed Apr. 5, 2019, and entitled "Simulating Autonomous Driving Using Map Data and Driving Data," U.S. patent application Ser. No. 16/555,988, filed Aug. 29, 2019, and entitled "Vehicle Controller Simulations," U.S. patent application Ser. No. 17/184,128, filed Feb. 24, 2021, and entitled "Simulated agent Conversions in Driving Simulations," U.S. patent Application Ser. No. 17/184,169, filed Feb. 24, 2021, and entitled "Simulating Simulated agents based on Driving Log Data," the entire contents of which are incorporated herein by reference for all purposes. In examples using log-based simulations, the scenarios upon which driving simulations are generated may be based on driving log data captured in actual physical environments.

In other examples, driving simulations may be generated based on synthetic scenarios created, ab initio, programmatically rather than based on log data from physical environments. For either log-based driving scenarios or synthetic scenarios, a simulation generator may generate a simulation by determining and programmatically simulating the static and/or dynamic objects (e.g., simulated agents) in the environment of the scenario, along with the various attributes and behaviors of the simulated agents. Driving simulations generated from log-based scenarios or synthetic scenarios may include one or more smart simulated agents operating autonomously or semi-autonomously in the simulated environment.

Techniques described herein can be implemented in various ways. In a first example, an agent controller can be configured to determine trajectories for a simulated agent during the simulation, and the agent controller may have access to other agents' trajectories during the simulation. In a second example case, when executing the simulation, an agent controller can determine the trajectories of other simulated agents in the simulated environment. A third example can be a mixture of the first case and the second case. For instance, in a third example, the simulation system can implement some agent controllers to determine (like in the second example case) other simulated agents' trajectories during the simulation, and can implement some agent controllers that have access (like in the first example case) to other simulated agents' trajectories. Additional details of example cases are given throughout this disclosure.

In some instances, a simulation system can execute a driving simulation that includes multiple simulated agents controlled by multiple agent controllers, such as a first simulated agent (may also be referred to as an observed agent) controlled by a first agent controller, a second simulated agent (may also be referred to as an observing agent) controlled by a second agent controller, and so on. At periodic times during the simulation, the agent controllers for the simulated agents may determine trajectories for the corresponding agents to follow. The trajectories determined periodically may be stored in trajectory buffers associated with each simulated agent. For example, at a first time point in the driving simulation, the first agent controller can determine a first trajectory for the first simulated agent to follow at the first time point, and the second agent controller can determine a second trajectory for the second simulated agent to follow at the first time point. The agent controllers may store the first trajectory and second trajectory in one or more buffer components associated with the simulated agents. Then, at a second subsequent time point in the driving simulation, the first agent controller can determine a reaction of the first simulated agent based at least in part on the previously-stored second trajectory of the second simulated agent associated with the first time point (e.g., rather than using a current trajectory of the second simulated agent associated with the second time point). Additionally or alternatively, the second agent controller can determine a reaction of the second simulated agent based at least in part on the previously-stored first trajectory of the first simulated agent associated with the first time point (e.g., rather than using a current trajectory of the first simulated agent associated with the first time point). By using the previously-stored trajectories of the other agents in the simulations, the agent controllers can incorporate a reaction delay when controlling the simulated agents in the driving simulation. As described herein, the reaction delay can be the time period between one agent's response to another agent's action.

In some instances, the length (or magnitude) of the reaction delay can be based on at least one of an assumed reaction time, a vehicle delay, or a distracted driver delay. In actual driving scenarios occurring in real physical environments, there may be reaction delays when a driver of a vehicle reacts to the movements of other vehicles or objects in the environment. In some instances, the driver may be distracted for a short time when driving a vehicle. For example, the driver may look in the back seat or look down for a second and may not react to another vehicle's movement immediately. Moreover, there may be a reaction time when a driver responds to a situation. For example, when the driver decelerates the vehicle, there is a delay between the time the driver moves her foot from the gas paddle and the time she hits the brake paddle. Furthermore, there can be a mechanical delay caused by the vehicle. For example, when the driver turns the steering wheel, the vehicle may have a mechanical delay between the driver's action and the actual turning movement of the vehicle. By adding a delay to the simulated agent reaction when executing the driving simulation, the simulation system can provide a simulation scenario more humanlike and realistic.

In various examples, the agent controller(s) can determine a reaction delay for an individual simulated agent independently. For example, in the simulation scenario, one simulated agent can have a relatively high reaction delay, and another simulated agent can have a relatively low reaction delay. In addition, the reaction delay for an individual simulated agent can vary over time. For example, a simulated agent can have a first delay at a first time point, and a second delay at a second time point. In some instances, the agent controller(s) can dynamically adjust the reaction delay for each simulated agent based on driving regions (e.g., different countries, cities, states, counties, etc.), different types of driving locations (e.g., rural, suburb, or city driving, highway driving, intersection with pedestrians, parking lot, school zone, construction zone, curved roads, hills, four-way stops, two-way stops, and the like), and/or different types of driving conditions (e.g., night driving, low-visibility driving, driving in rain or snow, etc.). In some instances, the reaction delay can reflect a driver's attentiveness while driving. For example, when the simulated agent is operating on a busy road, the driver's attentiveness may be relatively high, and the reaction delay may be relatively low. On the other hand, when the simulated agent is operating on a boring road, the driver's attentiveness may be relatively low, and the reaction delay may be relatively high.

In some instances, a second agent controller for a second simulated agent can use the previously-stored trajectories of other agents to determine the predicted positions of the other agents at subsequent time points in the driving simulation, based on a reaction delay associated with the first simulated agent. For example, at a second time point in the simulation, the second agent controller can retrieve the previously-stored trajectory of a first simulated agent at an earlier first time point. Then, the second agent controller can fast forward the previously-stored trajectory of the first simulated agent, from the first time point to the current second time point, to determine a predicted location and/or state of the first simulated agent at the second time point. The second agent controller then may control the second simulated agent based on the predicted location and/or state of the first simulated agent, rather than the actual location of the and/or state of the first simulated agent at the second time point, to simulate a reaction delay by the second simulated agent.

In some instances, the trajectories of the simulated agents can be stored in the buffer components in various manners, such as a first-in last-out (FILO) mode, a first-in-first-out (FIFO) mode, an overwriting mode, or the like, and can be updated periodically. In some instances, the buffer component can be further configured to store at least one of the traffic signal data, first simulated agent state data, or second simulated agent state data.

The techniques discussed herein may improve the functioning of a simulation computing system (e.g., simulation system) in many ways. For example, the simulation system described herein may control simulated agents within the simulated environment more realistically with reaction delays, so as to get more realistic (e.g., human-controlled) simulation results, which may be useful to improve the function of agent controllers. Moreover, autonomous vehicle control systems can be tested in driving simulations with simulated agent realism. The simulation computing system may be configured to simulate simulated agent interactions with little computing cost, while improving the accuracy of the simulation-based analysis of vehicle control systems, thereby improving the performance of the simulation computing system in validating autonomous vehicle controllers. Additional details regarding validating the performance of vehicle controllers are described in U.S. patent application Ser. No. 17/136,938 filed Dec. 29, 2020, and entitled "Vehicle Controller Validation," the entire contents of which are incorporated herein by reference for all purposes. Moreover, because the simulation system can simulate some dangerous situations that may not be easily tested in the real world, the techniques described herein also may enable an increased breadth of driving simulation. As such, the techniques described herein may improve the safety performance of autonomous vehicles.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

Figure 1B:
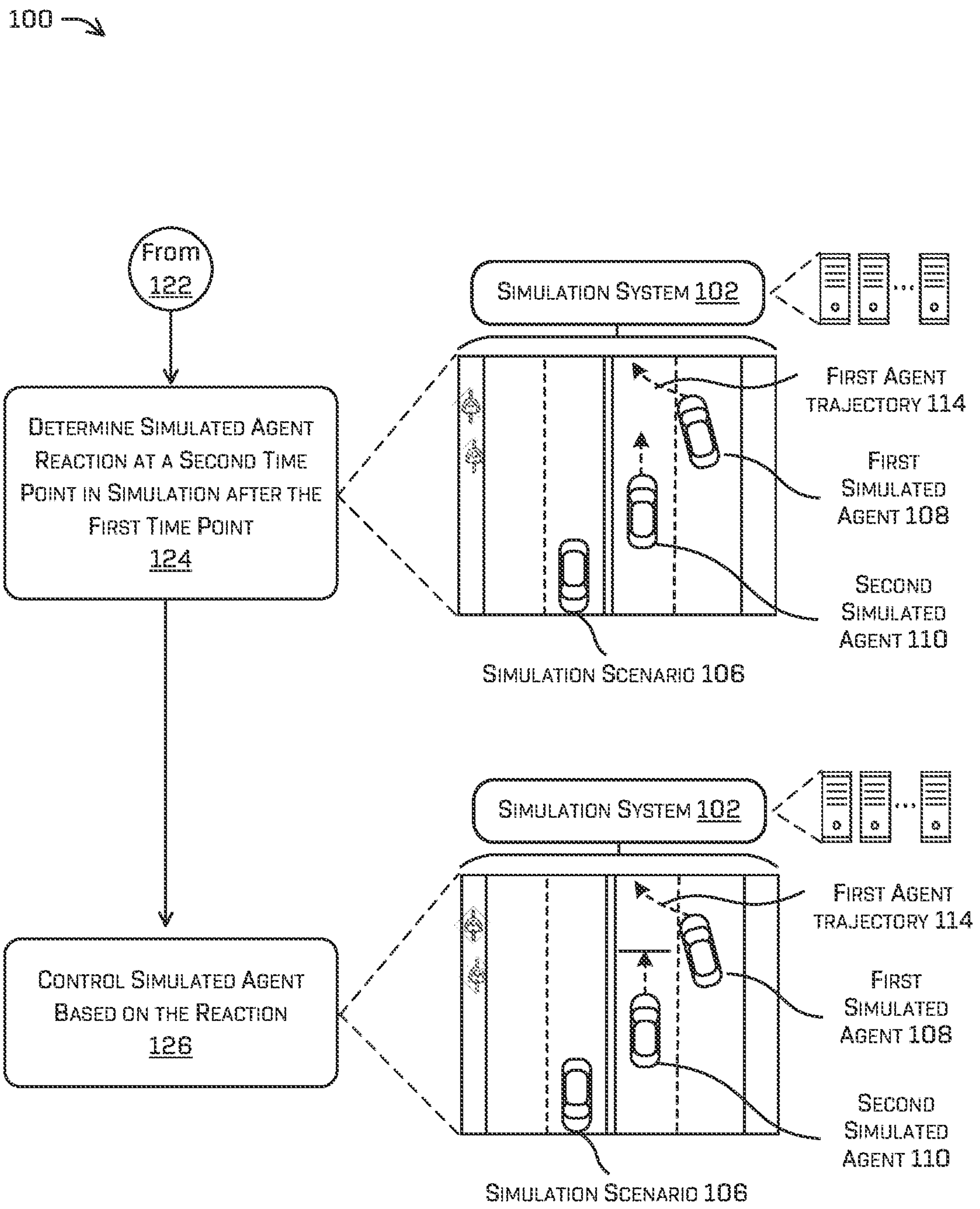

FIG. 1A and FIG. 1B depict an example process 100 of executing driving simulations, including multiple simulated agents that can interact with each other during the simulation. In various implementations, some or all of the operations in process 100 may be performed by a driving simulation system 102 described in more detail below.

At operation 104, a simulation system, such as simulation system 102, may execute a driving simulation including one or more simulated agents operating in an environment. For example, the simulation system 102 can generate a simulation scenario 106. The simulation scenario 106 can include objects such as static objects (e.g., buildings, bridges, signs, or the like), and/or simulated agents such as vehicles (e.g., cars, trucks, trains, or the like), pedestrians, bicyclists, or the like. The simulation scenario 106 can also include map markers (e.g., lane lines, sidewalks, crosswalks, junctions, parking spaces, or the like), traffic signs (e.g., stop signs, speed limits, traffic lights, parking signs, or the like), road construction signs, or the like. The simulation scenario 106 can also include different driving regions (e.g., different countries, cities, states, counties, and the like), different types of driving locations (e.g., rural, suburb, or city driving, highway driving, intersection with pedestrians, parking lot, school zone, construction zone, curved roads, hills, four-way stops, two-way stops, and the like), and/or different types of driving conditions (e.g., night driving, low-visibility driving, driving in rain or snow, and the like).

In this example, the simulation scenario 106 includes a number of simulated agents, such as the first simulated agent 108 (may also be referred to as observed simulated agent) and the second simulated agent 110 (may also be referred to as observing simulated agent). The simulated agents are configured to be controlled by the agent controller(s) (not shown). For example, a first agent controller can be configured to control the first simulated agent 108, and a second agent controller can be configured to control the second simulated agent 110. In this example, the simulation scenario 106 includes two simulated bicycle agents and at least four simulated vehicle agents, but in other examples, the simulation scenario 106 may include any number of different simulated agents of various object types (e.g., cars, trucks, pedestrians, bicycles, animals, etc.).

In various examples, the simulation scenario 106 can be generated based on the data (e.g., log data), such as utilizing the techniques described in the U.S. Patent Applications incorporated herein by reference above, or may generate the simulation scenario 106 based on a synthetic scenario created, programmatically rather than based on log data from a physical environment.

At operation 112, the simulation system 102 may determine one or more agent trajectories at a first time point in the simulation. The agent trajectories determined in operation 112 may include any movement or operation associated with simulated agents in the simulation scenario 106. For example, the simulation system 102 may determine the first agent trajectory 114 associated with the first simulated agent 108 within the simulation scenario 106, and may determine the second agent trajectory 116 associated with the second simulated agent 110 within the simulation scenario 106.

In this example, the first agent trajectory 114 indicates that the first simulated agent 108 is going to merge to the left lane in the simulation scenario 106. The second agent trajectory 116 indicate that the second simulated agent 110 is going to move forward. Note that these trajectories are examples rather than limitations. There can be other types of trajectories for the first simulated agent 108 and the second simulated agent 110. Moreover, there can be trajectories determined for other simulated agents (such as other cars and bicycles) in the simulation scenario 106.

In various examples, the agent trajectories determined in operation 112 may include simulated agent behaviors (e.g., merging, accelerating, decelerating, stopping, turning left, turning right, making a U-turn, parking, etc.), metrics (e.g., velocity metrics, acceleration/deceleration metrics, following distance metrics, lateral acceleration metrics, stopping location metrics relative to stop signs, crosswalks, or other objects, etc.), driving/navigation decisions (e.g., selecting routes, determining destinations, making detours, using turn signals, etc.), and the like associated with the simulated agents.

In various examples, an agent trajectory may include simulated agent behaviors (e.g., a direction of travel, a speed, an acceleration, a jerk, or the like) associated with a simulated agent at a plurality of time points during the simulation scenario 106. In some examples, the plurality of time points may include time points at a periodic interval.

In some examples, the agent trajectories can be updated/recalculated periodically or based on triggers. For example, the first agent controller can update the first agent trajectories associated with the first simulated agent every tick (e.g., every 0.1 seconds, or the like). As another example, the first agent controller can update the first agent trajectories associated with the first simulated agent when a trigger event occurs (e.g., another simulated agent coming close, driving into a junction, driving to a turning point, making a reaction to another simulated agent, or the like).

As described herein, agent trajectories may be determined for an individual simulated agent within the simulation scenario 106. Additionally or alternatively, agent trajectories may be determined for groupings of simulated agents can be determined within the simulation scenario 106. For example, agent trajectories can be determined for a group of cyclist agents within the simulation scenario 106, and agent trajectories can be determined for a group of truck agents within the simulation scenario 106, or the like. As another example, agent trajectories can be determined for a group of simulated agents in a geographical area within the simulation scenario 106, or the like.

At operation 118, the simulation system 102 may store the agent trajectories in one or more buffer component(s). In various examples, the simulation system 102 may include one or more buffer components such as a first agent buffer component 120, a second agent buffer component 122, or the like. In this example, the first agent buffer component 120 is configured to store the first agent trajectory 114 associated with the first simulated agent 108, and the second agent buffer component 122 is configured to store the second agent trajectory 116. In some examples, the number of buffer components can match the number of simulated agents in the simulation scenario 106 such that an individual simulated agent corresponds to an individual buffer component. In some examples, the number of buffer components does not need to match the number of simulated agents in the simulation scenario 106, and different simulated agents can share one or more buffer components.

As described herein, an individual buffer component (e.g., the first agent buffer component 120, the second agent buffer component 122, or the like) is a region of memory used to temporarily store data. In some examples, the buffer components can be used to store data in various modes, such as a first-in-last-out (FILO) mode, a first-in-first-out (FIFO) mode, an overwriting mode, or the like. In various implementations, the buffer components can be implemented using any suitable memory technology, such as static random access memory (SRAM), synchronous dynamic RAM (SDRAM), nonvolatile/Flash-type memory, or any other type of memory capable of storing information. Additional details regarding the buffer components are given throughout this disclosure.

In some examples, an individual controller can have access to a corresponding buffer component. For example, a first agent controller, which is configured to control the first simulated agent 108 can have access to the first agent buffer component 120. A second agent controller, which is configured to control the first simulated agent 108 can have access to the second agent buffer component 122. Additionally or alternatively, an individual controller can have access to a corresponding buffer component and other buffer components. For example, the first agent controller, which is configured to control the first simulated agent 108 can have access to the first agent buffer component 120, the second agent buffer component 122, and other buffer components configured to store other trajectories associated with other simulated agents in the simulation scenario 106. A second agent controller, which is configured to control the first simulated agent 108 can have access to the first agent buffer component 120, the second agent buffer component 122, and other buffer components configured to store other trajectories associated with other simulated agents in the simulation scenario 106.

At operation 124, the simulation system 102 may determine a simulated agent reaction at a second time point in the situation after the first time point. In various examples, the reaction may include simulated agent maneuvers such as accelerating, decelerating, stopping, turning left, turning right, merging, making a U-turn, parking, or the like. In various examples, the time period between the first time point and the second time point is a reaction delay.

As noted above, in real life, there may be a reaction delay when a driver of a vehicle reacts to other vehicles' (or objects') moves. In some instances, the driver may be distracted for a short time when driving a vehicle. For example, the driver may look in the back seat or look down for a second and may not react to another vehicle's movement immediately. Moreover, there may be a reaction time when a driver responds to a situation. For example, when the driver decelerates the vehicle, there is a reaction delay between the time the driver moves her foot from the gas paddle and the time she hits the brake paddle. Furthermore, there can be a mechanical delay caused by the vehicle. For example, when the driver turns the steering wheel, the vehicle may have a mechanical delay between the driver's action and the actual turning movement of the vehicle. By adding a reaction delay to the simulated agent reaction when executing the driving simulation, the simulation system 102 can provide a simulation scenario more humanlike and realistic.

In some examples, the reaction delay can be determined based on factors such as behavior characteristics for agents, weather conditions, vehicle types, vehicle models, etc. The behavior characteristics for agents may include patterns of behavior that might not be directly observable based on driving log data or simulation log data, but may be derived or estimated based on one or more observable data. For instance, high-level (or derived) behavior characteristics may include driving styles and/or driver personality types, which may be determined for playback agents and smart agents, based on the underlying observable object behaviors such as velocities, accelerations, following distances, movement jerkiness, adherence to driving rules and right-of-way, etc. Examples of driving styles and/or driver personality types may include, but are not limited to, an aggression metric, a driving skill metric, a reaction time metric, a law abidance metric, etc. Similar movement styles and/or personality types may be determined for non-vehicle agents (e.g., pedestrians, bicycles, etc.), based on the underlying observable behaviors of the different object types. Additional details regarding simulated agents' behavior characteristics are described in U.S. patent application Ser. No. 17/411,760, filed on Aug. 25, 2021, and entitled "Parameterized Object Controllers In Driving Simulations," the entire contents of which are incorporated herein by reference for all purposes.

In some examples, the reaction delay can be parametrized to represent realistic delays that can be observed in the real world. For example, the simulation system may determine distributions characterizing real-life reaction delays thereof and apply the distributions to the simulation. For instance, for multiple smart agent vehicles in a simulation, the simulation system may determine a desired distribution of 10% of drivers with high reaction delays, 40% of drivers with medium reaction delays, 50% of drivers with low reaction delays, and so on. For example, the parameterization may be based on a corresponding operational design domain that the simulations are intended to represent (e.g., a certain geographically bound location, under certain weather conditions, under certain environmental types such as dense urban vs rural neighborhoods, certain maneuvers, etc.). Thus, different sets of simulations may each correspond to a respective distribution of driver delays depending on the characteristics of the sets of simulations.

In various examples, the agent controller(s) can determine a reaction delay for an individual simulated agent independently. For example, in the simulation scenario 106, one simulated agent can have a relatively high reaction delay, and another simulated agent can have a relatively low reaction delay. In addition, the reaction delay for an individual simulated agent can vary over time. For example, a simulated agent can have a first delay at a first time point, and a second delay at a second time point. In some instances, the agent controller(s) can dynamically adjust the reaction delay for each simulated agent based on driving regions (e.g., different countries, cities, states, counties, etc.), different types of driving locations (e.g., rural, suburb, or city driving, highway driving, intersection with pedestrians, parking lot, school zone, construction zone, curved roads, hills, four-way stops, two-way stops, and the like), and/or different types of driving conditions (e.g., night driving, low-visibility driving, driving in rain or snow, and the like). In some instances, the reaction delay can reflect a driver's attentiveness while driving. For example, when the simulated agent is operating on a busy road, the driver's attentiveness may be relatively high, and the reaction delay may be relatively low. On the other hand, when the simulated agent is operating on a boring road, the driver's attentiveness may be relatively low, and the reaction delay may be relatively high.

In this example, at the second time point after the second time point, the first simulated agent 108 is going to merge to the left lane. The second agent controller, at the second time point, can determine a reaction for the second simulated agent 110 in response to the first simulated agent 108 based on the first agent trajectory 114. For example, the reaction can be decelerating the second simulated agent 110 to accommodate the first simulated agent 108. As noted above, there is a reaction delay between the first time point and the second time point. Like in the real world, a driver of a vehicle may look around or not pay attention to the road at the first time point, and does not make reaction to another vehicle's move immediately. Then, after two seconds, the driver notices the other vehicle's situation and makes a reaction. As another example, when realizing that the other vehicle is going to merge, the driver may move her foot from the gas paddle to the brake paddle, which may take half a second. Moreover, there may be a mechanical transmission time from when the driver of hits the brake paddle, to the time the vehicle actually starts to decelerate. Therefore, adding a reaction delay to the reaction of the simulated agent can mimic reality well.

At operation 126, the simulation system 102 may control the simulated agent based on the reaction. For example, at the second time point after the first time point, the simulation system 102 may execute the second agent controller to control the second simulated agent 110 to perform the reaction determined in operation 124. In this example, the reaction can be decelerating the second simulated agent 110 to accommodate the first simulated agent 108. Additionally or alternatively, the reaction can be stopping the second simulated agent 110 at a stopping point, changing lane, etc.

During the simulation, the simulation system 102 may execute agent controller(s) to control the simulated agents within the simulation scenario 106, based on the agent trajectories associated with the simulated agents. In some examples, the agent controller(s) may be configured to determine behaviors for the simulated agents, including lane changes, speed adjustments, adjusting positions in a lane, when to yield, when to stop/re-route, etc. The agent controller(s) may also be configured to determine one or more metrics for the simulated agents, including accelerations, velocities, yaw rates and/or yaw angles, and the like. The agent controller(s) may control the simulated agent(s) utilizing techniques, such as those described in U.S. patents application Ser. Nos. 16/555,988 and 17/184,128, the entire contents of which are incorporated herein by reference above.

Figure 2:
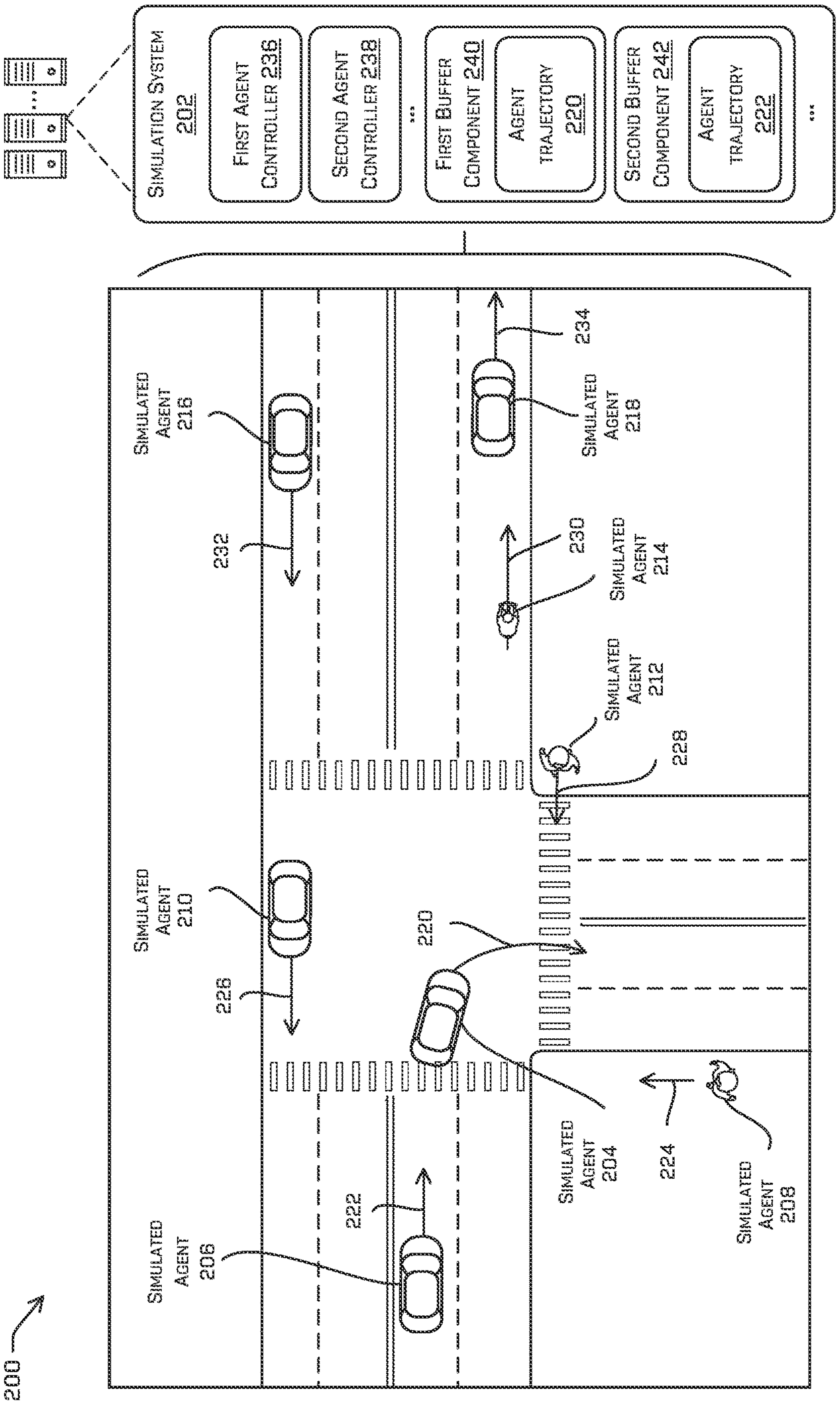
FIG. 2 depicts a simulation scenario generated by a simulation system including multiple simulated agents that can interact with each other.

FIG. 2 depicts a simulation scenario 200 generated by a simulation system 202 including multiple simulated agents that can interact with each other. As described herein, the simulation system 202 can correspond to the simulation system 102 in FIG. 1A and FIG. 1B. The simulation scenario 200 can correspond to the simulation scenario 106 in FIG. 1A and FIG. 1B. The simulated agents in the simulation scenario 200 can be implemented in a similar manner to the simulated agents in the simulation scenario 106 in FIG. 1A and FIG. 1B.

As shown in the illustrated example, the simulation scenario 200 may include simulated agent 204, simulated agent 206, simulated agent 208, simulated agent 210, simulated agent 212, simulated agent 214, simulated agent 216, simulated agent 218, etc. An individual simulated agent can be associated with one or more agent trajectories. For example, simulated agent 204 can be associated with agent trajectory 220. Simulated agent 206 can be associated with agent trajectory 222. Simulated agent 208 can be associated with agent trajectory 224. Simulated agent 210 can be associated with agent trajectory 226. Simulated agent 212 can be associated with agent trajectory 228. Simulated agent 214 can be associated with agent trajectory 230. Simulated agent 216 can be associated with agent trajectory 232. Simulated agent 218 can be associated with agent trajectory 234. During the simulation, an individual simulated agent may be controlled to follow an associated agent trajectory.

In some examples, the agent trajectories can be updated/recalculated periodically or based on triggers. For example, the simulation system 202 can update the agent trajectories associated with the simulated agents every 0.1 seconds, or the like. As another example, the simulation system 202 can update the agent trajectories associated with the simulated agent when a trigger event occurs (e.g., two simulated agents coming close, a simulated agent driving into a junction, a simulated agent driving to a turning point, one simulated agent making the reaction to another simulated agent, or the like).

In the illustrated example, the simulation system 202 may include a plurality of agent controllers configured to control the multiple simulated agents in the simulation scenario 200 and one or more buffer components configured to store agent trajectories associated with multiple simulated agents in the simulation scenario 200. For example, a plurality of agent controllers may include a first agent controller 236 configured to control simulated agent 204, a second agent controller 238 configured to control simulated agent 206, etc.

In some examples, an agent controller can determine navigation decisions, movements, and/or other behaviors for a simulated agent while traversing the simulated environment. For instance, the agent controller may determine the velocities at which a simulated agent moves during a simulation, its acceleration and/or deceleration rates, its following distances, its lateral acceleration rates while turning, its stopping locations, etc. The agent controller also may make other decisions for the simulated agent, including but are not limited to, how the simulated agent performs route planning, whether or not the simulated agent will use bike lanes when determining a route, whether the simulated agent will use lane splitting and/or lane sharing, the desired cruising speed of the simulated agent relative to the speed limit (based on simulated agent type), the maximum possible speed and acceleration of the simulated agent (based on simulated agent type), the desired distances of the simulated agent from other simulated agents in the simulated environment (based on simulated agent type), or the like. Moreover, the agent controller also may determine simulated agent interactions during the simulation including but are not limited to, decelerating when a front simulated agent decelerates, yielding when another simulated agent merges from an adjacent lane, accelerating when a front simulated agent accelerates, stopping when getting too close to another simulated agent, or the like.

In some examples, the number of agent controllers can match the number of simulated agents in the simulation scenario 200 such that an individual simulated agent corresponds to an individual agent controller, and an individual agent controller can be configured to control the corresponding individual simulated agent. In some examples, the number of agent controllers does not need to match the number of simulated agents in the simulation scenario 200, and an individual agent controller can be configured to control one or more simulated agents. For example, one agent controller can be configured to control the pedestrians (e.g., simulated agent 208, simulated agent 212, or the like), and another agent controller can be configured to control the cyclist (e.g., simulated agent 214 or the like).

In the illustrated example, the one or more buffer components may include a first buffer component 240 configured to store agent trajectory 220 associated with simulated agent 204, a second buffer component 242 configured to store agent trajectory 222 associated with simulated agent 206, etc. As described herein, an individual buffer component (e.g., the first agent controller 236, the second agent controller 238, or the like) can be implemented as a region of memory used to temporarily store data. In some examples, the buffer components can be used to store data in various modes, such as a first-in-last-out (FILO) mode, a first-in-first-out (FIFO) mode, and overwriting mode, or the like. In various implementations, the buffer components can be implemented using any suitable memory technology, such as static random access memory (SRAM), synchronous dynamic RAM (SDRAM), nonvolatile/Flash-type memory, or any other type of memory capable of storing information. Additional details regarding the buffer components are given throughout this disclosure.

In some examples, the number of buffer components can match the number of simulated agents in the simulation scenario 200 such that an individual simulated agent corresponds to an individual buffer component, and agent trajectories associated with the individual simulated agent can be stored in a corresponding buffer component. In some examples, the number of buffer components does not need to match the number of simulated agents in the simulation scenario 200, and different simulated agents can share one or more buffer components.

In some examples, the buffer components can also be configured to store other data, such as agent state data, traffic data, weather data, or the like. Examples of agent state data can include information regarding agent type (e.g., train, car, truck, bicycle, pedestrian, or the like), agent size, agent shape, or the like. Examples of traffic data can include information regarding stop signs, speed limits, traffic lights, parking signs, or the like. Examples of weather data can include information regarding rainy weather, sunny weather, snowy weather, or the like.

In some examples, an individual controller can have access to a corresponding buffer component. For example, a first agent controller, which is configured to control the first simulated agent 108 can have access to the first agent buffer component 120. A second agent controller, which is configured to control the first simulated agent 108 can have access to the second agent buffer component 122. Additionally or alternatively, an individual agent controller can have access to a corresponding buffer component and other buffer components. For example, the first agent controller 236, which is configured to control simulated agent 204 can have access to the first buffer component 240 configured to store agent trajectories 220, the second buffer component 242 configured to store agent trajectory 222, and other buffer components configured to store other agent trajectories associated with other simulated agents in the simulation scenario 200. A second agent controller, which is configured to control the simulated agent 206 the first buffer component 240 configured to store agent trajectories 220, the second buffer component 242 configured to store agent trajectory 222, and other buffer components configured to store other agent trajectories associated with other simulated agents in the simulation scenario 200.

As an example, the first agent controller 236 is configured to control simulated agent 204 in the simulation scenario 200. The first agent controller 236 can determine agent trajectories 220 for simulated agent 204 and store agent trajectories 220 in the first buffer component 240. The agent trajectories 220 can include information regarding simulated agent behaviors (e.g., lane changes, right turn, left turn, speed adjustments, adjusting positions in a lane, when to yield, or the like), metrics (e.g., accelerations, velocities, yaw rates and/or yaw angles, following distances, its lateral acceleration rates while turning, stopping locations, or the like), navigation decisions (e.g., how to perform route planning, which lane to use, the desired cruising speed, when to stop/re-route, or the like), or the like. The first agent controller 236 also can determine a reaction for simulated agent 204 in response to other simulated agents' movements/behavior.

Similarly, the second agent controller 238 is configured to control simulated agent 206 in the simulation scenario 200. The second agent controller 238 can determine agent trajectory 222 for simulated agent 206 and store agent trajectory 222 in the second buffer component 242. The agent trajectory 222 can include information regarding simulated agent behaviors (e.g., lane changes, right turn, left turn, speed adjustments, adjusting positions in a lane, when to yield, or the like), metrics (e.g., accelerations, velocities, yaw rates and/or yaw angles, following distances, lateral acceleration rates while turning, stopping locations, or the like), navigation decisions (e.g., how to perform route planning, which lane to use, the desired cruising speed, when to stop/re-route, or the like), or the like. The second agent controller 238 also can determine a reaction for simulated agent 206 in response to other simulated agents' movements/behavior.

In the illustrated example, the second agent controller 238 may have access to the first buffer component 240. At a first time point $t_1$ during the simulation, the second agent controller 238 may retrieve agent trajectory 222 associated with simulated agent 206 in the simulation scenario 200. At a second time point $t_2$ after the first time point $t_1$ during the simulation, the second agent controller 238 may determine a reaction for the simulated agent 206 based on the agent trajectories 220 associated with the simulated agent 204 determined at the first time point $t_1$. The time interval between the first time point $t_1$ and the second time point $t_2$ can be referred to as a "reaction delay." Therefore, $t_2=t_1+$ reaction delay. The reaction delay can be determined to mimic real-life situations, such as several milliseconds, half a second, several seconds, or the like. Note that those numbers are examples, rather than limitations, and other time periods can be used as the reaction delay.

In this example, at the second time point $t_2$, based on the agent trajectories 220 of simulated agent 204 associated with the first time point $t_1$, the second agent controller 238 can determine that simulated agent 204 is going to turn right at a junction, and can determine a reaction of decelerating for simulated agent 206. The second agent controller 238, at the second time point $t_2$, can also control the simulated agent 206 to perform the reaction of decelerating as determined. Therefore, the simulated agent 206 does not react to simulated agent 204's movement instantaneously but reacts after a reaction delay. As noted above, such a reaction delay can reflect the real word situation and can make the simulation more realistic.

In other words, at the second time point $t_2$, the second agent controller 238 uses old agent trajectories 220 of simulated agent 204 determined at the first time point $t_1$ to determine the reaction for simulated agent 206. Moreover, when executing the simulation, the simulation system 202 can fast forward the agent trajectories 220 determined at the first time point $t_1$ to get the location and/or state of the simulated agent 204 at the second time point $t_2$. Additional details are given throughout this disclosure, for example, with respect to FIGS. 3A-3C.

As described above, in a first example case, an individual agent controller can be configured to determine trajectories for a corresponding simulated agent in the simulation scenario 200, and the individual agent controller may have access to other agents' trajectories during the simulation. As such, the computation expense can be reasonable.

Additionally, in a second example case, when executing the simulation, the simulation system 302 can implement agent controllers that can predict trajectories of other simulated agents in the simulated environment. In the real world, a vehicle may not have access to the trajectories of other vehicles in the physical environment. Rather, the driver of the vehicle may predict the trajectories of other vehicles in the environment. Such a simulation in which an individual agent control predicts trajectories of other simulated agents may be more realistic. Note that in such a simulation, the computing expense (e.g., computing time, the consumption of computing resources, or the like) can be relatively high compared to the first example case, because predicting trajectories of other simulated agents may have a higher computational cost during the simulation. For example, the second agent controller 238, which is configured to control the simulated agent 206, can predict trajectories associated with other simulated agents (e.g., the first agent trajectories 220 associated with the first simulated agent 304) in the driving simulation scenario 200.

The prediction performed by the agent controller may include observation and/or perception performed by the agent controller, such as identifying characteristics of the environment and/or other agents in the simulated environment detected in proximity to the simulated agent. In some examples, the individual agent controller can perform the prediction at periodic time intervals (e.g., every 0.1 seconds, every 0.05 seconds, every second, etc.) within the simulation scenario 200 and save the predicted trajectories in the buffer components in the simulation system 202. For instance, the second agent controller 238 may predict the trajectories of other simulated agents in the simulation scenario 200. The predicted trajectories can include position, location, velocity, acceleration, moving direction, turning angle, jerk, and the like associated with the simulated agent.

Two example cases are described above. In the first example case, the individual agent controller may have access to other agents' trajectories during the simulation, while in the second example case, the individual agent controller may predict other agents' trajectories during the simulation. Additionally, there can be a third example case which is a mixture of the first case and the second case. For example, in the third example case, when executing the simulation, the simulation system 202 can implement some agent controllers to predict (like in the second example case) other simulated agents' trajectories during the simulation, and can implement some agent controllers that have access (like in the first example case) to other simulated agents' trajectories. As described above, the first example case may have a relatively low computational expense, while the second example case may have a relatively high computational expense. In the third example case, computational expense maybe in-between.

Figure 3A:
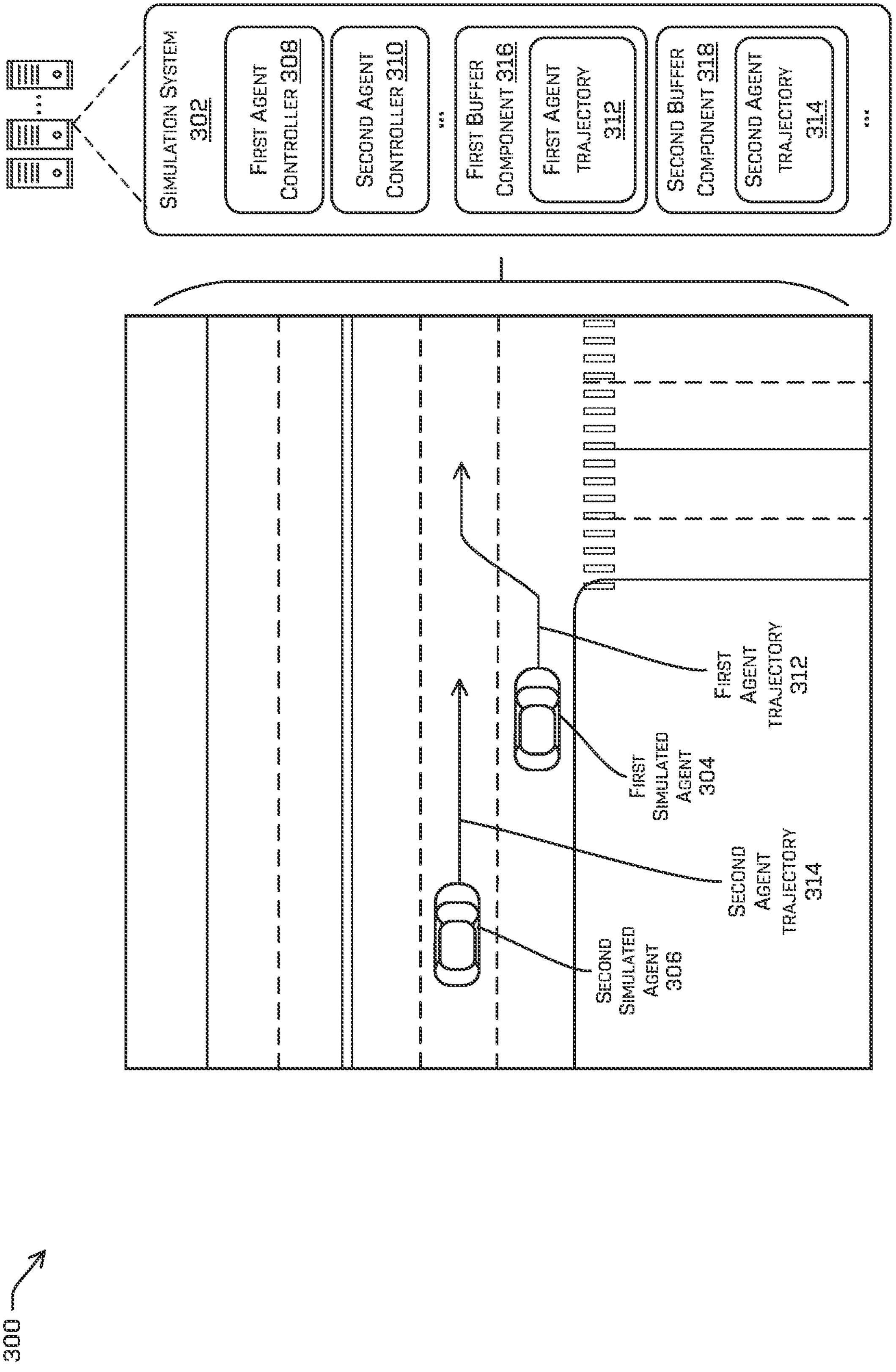
FIG. 3A, FIG. 3B, and FIG. 3C depict a driving simulation scenario including simulated agents interacting with one another within a simulated environment generated by a simulation system.
Figure 3B:
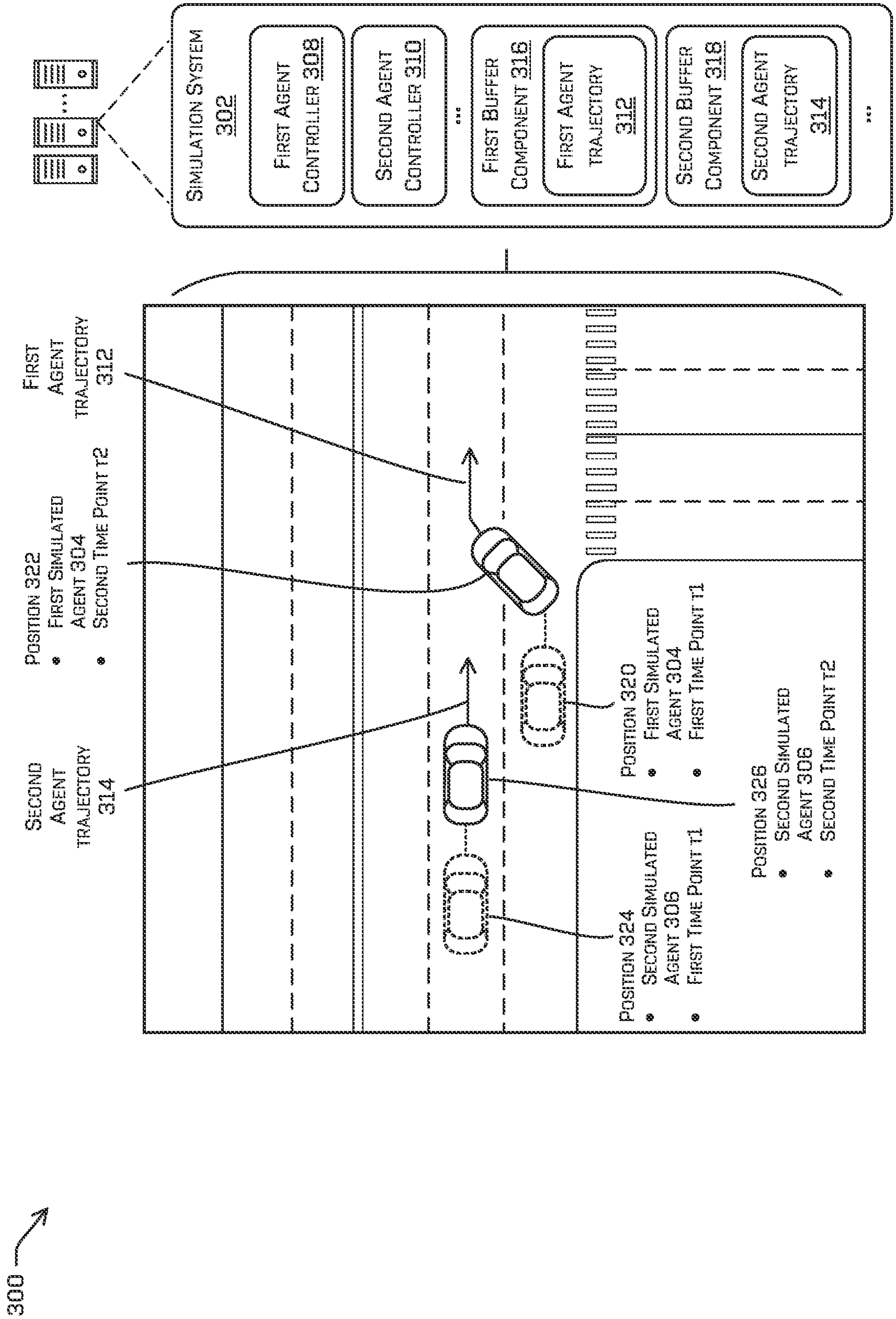
Figure 3C:
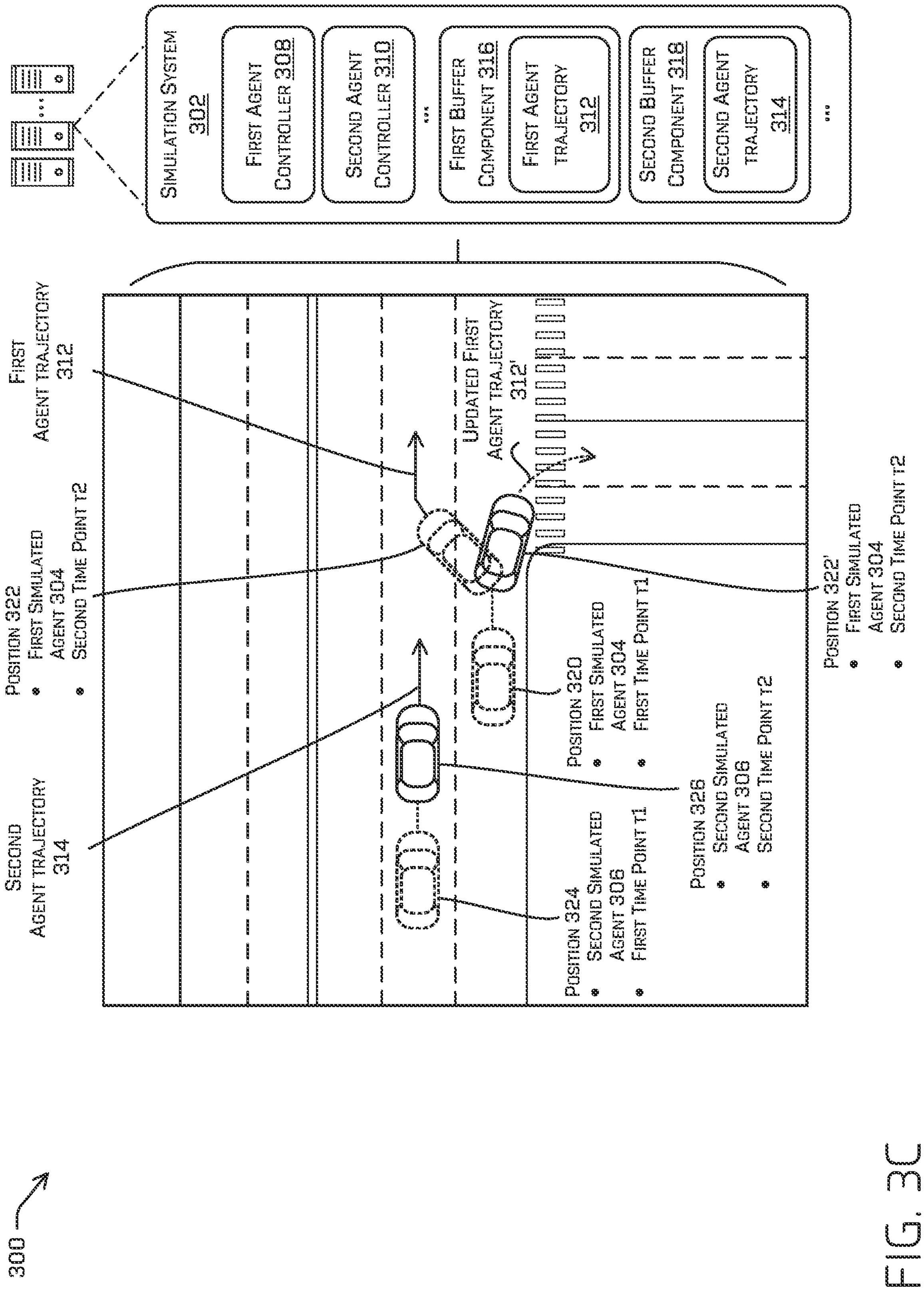

FIGS. 3A-3C depict a driving simulation scenario 300 including simulated agents interacting with one another within a simulated environment generated by a simulation system 302. As described herein, the simulation system 302 can correspond to the simulation system 202 in FIG. 2 and the simulation system 102 in FIG. 1A and FIG. 1B. The driving simulation scenario 300 can correspond to the simulation scenario 200 in FIG. 2 and the simulation scenario 106 in FIG. 1A and FIG. 1B. The simulated agents in the simulation scenario 300 can be implemented in a similar manner to the simulated agents in the simulation scenario 106 in FIG. 1A and FIG. 1B and the simulated agents in the simulation scenario 200 in FIG. 2.

In the illustrated example, the simulation scenario 200 may include a first simulated agent 304 and a second simulated agent 306. Note that though FIG. 3A shows two simulated agents, the simulation scenario 200 can include other simulated agents. The first simulated agent 304 can be associated with and move along first agent trajectory 312, and the second simulated agent 306 can be associated with and move along second agent trajectory 314.

In some examples, the agent trajectories can be updated/recalculated periodically or based on triggers. For example, the simulation system 302 can update the agent trajectories associated with the simulated agents every 0.1 seconds, or the like. As another example, the simulation system 302 can update the agent trajectories associated with the simulated agent when a trigger event occurs (e.g., two simulated agents coming close, a simulated agent driving into a junction, a simulated agent driving to a turning point, one simulated agent making the reaction to another simulated agent, or the like).

As shown in the illustrated example, the simulation scenario 300 is generated and executed by the simulation system 302. The simulation system 302 may include a plurality of agent controllers configured to control the multiple simulated agents in the simulation scenario 300 and one or more buffer components configured to store agent trajectories associated with multiple simulated agents in the simulation scenario 300. For example, the plurality of agent controllers may include a first agent controller 308 configured to control the first simulated agent 304, a second agent controller 310 configured to control the second simulated agent 306, etc. The plurality of agent controllers in FIG. 3A can be implemented in a similar manner to the agent controllers described with respect to FIG. 1A and FIG. 1B and FIG. 2.

In the illustrated example, the first agent controller 308 can determine navigation decisions, movements, and/or other behaviors for the first simulated agent 304 while traversing the simulated environment. The second agent controller 310 can determine navigation decisions, movements, and/or other behaviors for the second simulated agent 306 while traversing the simulated environment.

In the illustrated example, the one or more buffer components may include a first buffer component 316 configured to store first agent trajectory 312 associated with the first simulated agent 304, a second buffer component 318 configured to store second agent trajectory 314 associated with the second simulated agent 306, etc. As described herein, the buffer components can be implemented in a similar manner to the buffer components described with respect to FIG. 1A and FIG. 1B and FIG. 2. In some examples, the buffer components can also be configured to store other data, such as agent state data, traffic data, weather data, or the like. Examples of agent state data can include information regarding agent type (e.g., train, car, truck, bicycle, pedestrian, or the like), agent size, agent shape, or the like. Examples of traffic data can include information regarding stop signs, speed limits, traffic lights, parking signs, or the like. Examples of weather data can include information regarding rainy weather, sunny weather, snowy weather, or the like.

In a first example case, the first agent controller 308 can determine first agent trajectory 312 for the first simulated agent 304 and store the first agent trajectory 312 in the first buffer component 316. The first agent trajectory 312 can include information regarding simulated agent behaviors (e.g., lane changes, right turn, left turn, speed adjustments, adjusting positions in a lane, when to yield, or the like), metrics (e.g., accelerations, velocities, yaw rates and/or yaw angles, following distances, its lateral acceleration rates while turning, stopping locations, or the like), navigation decisions (e.g., how to perform route planning, which lane to use, the desired cruising speed, when to stop/re-route, or the like), or the like. The first agent controller 308 also can determine a reaction for the first simulated agent 304 in response to other simulated agents' movements/behaviors.

Similarly, the second agent controller 310 can determine the second agent trajectory 314 for the second simulated agent 306 and store the second agent trajectory 314 in the second buffer component 318. The second agent trajectory 314 can include information regarding simulated agent behaviors (e.g., lane changes, right turn, left turn, speed adjustments, adjusting positions in a lane, when to yield, or the like), metrics (e.g., accelerations, velocities, yaw rates and/or yaw angles, following distances, lateral acceleration rates while turning, stopping locations, or the like), navigation decisions (e.g., how to perform route planning, which lane to use, the desired cruising speed, when to stop/re-route, or the like), or the like. The second agent controller 310 also can determine a reaction for the second simulated agent 306 in response to other simulated agents' movements/behaviors.

In a second example case, an individual agent controller, which is configured to control a simulated agent, can determine trajectories associated with other simulated agents in the driving simulation scenario 300. For example, the second agent controller 310, which is configured to control the second simulated agent 306, can determine trajectories associated with other simulated agents (e.g., the first agent trajectory 312 associated with the first simulated agent 304) in the driving simulation scenario 300. The determination performed by the agent controller may include observation and/or perception performed by the agent controller, such as identifying characteristics of the environment and/or other agents in the simulated environment detected in proximity to the simulated agent. In some examples, the individual agent controller can perform the determination at periodic time intervals (e.g., every 0.1 seconds, every 0.05 seconds, every second, etc.) within the simulation scenario 300 and save the trajectories in the buffer components in the simulation system 302. For instance, for each simulated agent presented in the simulation scenario 300, the second simulated agent 306 may determine the trajectories of other simulated agents. The determined trajectories can include position, location, velocity, acceleration, moving direction, turning angle, jerk, and the like associated with the simulated agent.

In a third example case, which is a mixture of the first example case and the second example case, the simulation system 302 can implement some agent controllers to determine other simulated agents' trajectories during the simulation, and some agent controllers to access other simulated agents' trajectories. As described above, the first case may have a relatively low computational expense, while the second case may have a relatively high computational expense. In the third case, computational expense maybe in-between.

Referring to FIG. 3B, in the illustrated example, position 320 shows the position of the first simulated agent 304 at the first time point $t_1$ during the simulation, position 322 shows the position of the first simulated agent 304 at the second time point $t_2$ during the simulation. In this example, position 324 shows the position of the second simulated agent 306 at the first time point $t_1$ during the simulation, position 326 shows the position of the second simulated agent 306 at the second time point $t_2$ during the simulation.

In this example, at the first time point $t_1$ during the simulation, the second agent controller 310 may retrieve or determine first agent trajectory 312 associated with second simulated agent 306 in the simulation scenario 300. At the second time point $t_2$ after the first time point $t_1$ during the simulation, the second agent controller 310 may determine a reaction for the second simulated agent 306 based on the first agent trajectory 312 associated with the first simulated agent 304 determined at the first time point $t_1$. The time interval between the first time point $t_1$ and the second time point $t_2$ can be referred to as a "reaction delay." In other words, $t_2=t_1$+reaction delay. The reaction delay can be determined to mimic real-life situations, such as several milliseconds, half a second, several seconds, or the like. Note that those numbers are examples, rather than limitations, and other time periods can be used as the reaction delay.

In this example, at the second time point $t_2$, based on the first agent trajectory 312 of first simulated agent 304 determined at the first time point $t_1$, the second agent controller 310 can determine that second simulated agent 306 is going to merge into the lane in front of the second simulated agent 306, and can determine a reaction of decelerating for the second simulated agent 306. The second agent controller 310, at the second time point $t_2$, can also control the second simulated agent 306 to perform the reaction of decelerating. As such, the second simulated agent 306 does not react to the first simulated agent 304's movement (e.g., merging into the lane or the like) instantaneously but reacts (e.g., by decelerating or the like) after a reaction delay. As noted above, such a reaction delay can reflect the real word situation and can make the simulation more realistic.

In other words, at the second time point $t_2$, the second agent controller 310 uses old first agent trajectory 312 of the first simulated agent 304 determined at the first time point $t_1$ to determine the reaction for the second simulated agent 306. As such, the reaction of the second simulated agent 306 can be more realistic and humanlike, because in the real world, a driver may have a reaction time, may not pay attention to the road for a second, or there may be a mechanical delay of the vehicle.

In addition, when executing the simulation, the simulation system 202 can fast forward the first agent trajectory 312 determined at the first time point $t_1$ to obtain the position and/or state of the first simulated agent 304 at the second time point $t_2$. For example, a first agent trajectory 312 associated with the first simulated agent 304 is 3 seconds long, and the reaction delay is 0.5 seconds. In this example, the simulation system 202 can execute the second agent controller 310 to fast forward the first agent trajectory 312 (which is determined at the first time point $t_1$) for 0.5 seconds to get position 322 which is the position of the first simulated agent 304 at the second time point $t_2$. In other words, after being fast-forwarded, the first agent trajectory 312 is truncated, and at the second time point $t_2$, the first agent trajectory 312 is 2.5 seconds long (3 seconds-0.5 seconds=2.5 seconds). Note that these numbers are examples rather than limitations, and there can be other lengths of the reaction delay and the trajectories.

Referring to FIG. 3C, in the illustrated example, the simulation system 302 can implement the first agent controller 308 to determine the first agent trajectory 312, and can implement the second agent controller 310 to determine the second agent trajectory 314. In some instances, the first agent controller 308 may update the first agent trajectory from time to time. For example, at the second time point $t_2$ after the first time point $t_1$ during the simulation, the first agent controller 308 can determine an updated first agent trajectory 312'. In this example, instead of merging into the lane in front of the second simulated agent 306 (as shown by the old first agent trajectory 312), the first simulated agent is going to turn right (as shown by the updated first agent trajectory 312').

In the illustrated example, position 320 shows the position of the first simulated agent 304 at the first time point $t_1$ during the simulation, and position 322 shows the position of the first simulated agent 304 at the second time point $t_2$ in the first agent trajectory 312 determined at the first time point $t_1$, and position 322' shows the actual position of the first simulated agent 304 at the second time point $t_2$ during the simulation. In this example, position 324 shows the position of the second simulated agent 306 at the first time point $t_1$ during the simulation, position 326 shows the position of the second simulated agent 306 at the second time point $t_2$ during the simulation.

As shown in this example, according to the old first agent trajectory 312 determined at the first time point $t_1$, the first simulated agent 304 is going to merge into the lane in front of the second simulated agent 306. Based on such an old first agent trajectory 312, after a reaction delay, at the second time point $t_2$, the second agent controller 310 can determine a reaction for the second simulated agent 306 to decelerate/brake to accommodate the first simulated agent 304 to the lane area in front of second simulated agent 306. Then, at the second time point $t_2$, based on the determined reaction, the second agent controller 310 can control the second simulated agent 306 to decelerate/brake based on the old first agent trajectory 312.

On the other hand, at the second time point $t_2$, because the first agent controller 308 determines an updated first agent trajectory 312' for the first simulated agent 304, the first agent controller 308 can control the first simulated agent 304 based on the updated first agent trajectory 312'. In this example, the first simulated agent 304 turns right at the second time point $t_2$ merging into the lane in front of the second simulated agent 306. This example reflects a situation where the updated first agent trajectory 312' at the second time point $t_2$ does not match the old first agent trajectory 312 at the first time point $t_1$, while the second simulated agent 306 reacts by decelerating/braking because it uses the old first agent trajectory 312.

Figure 4:
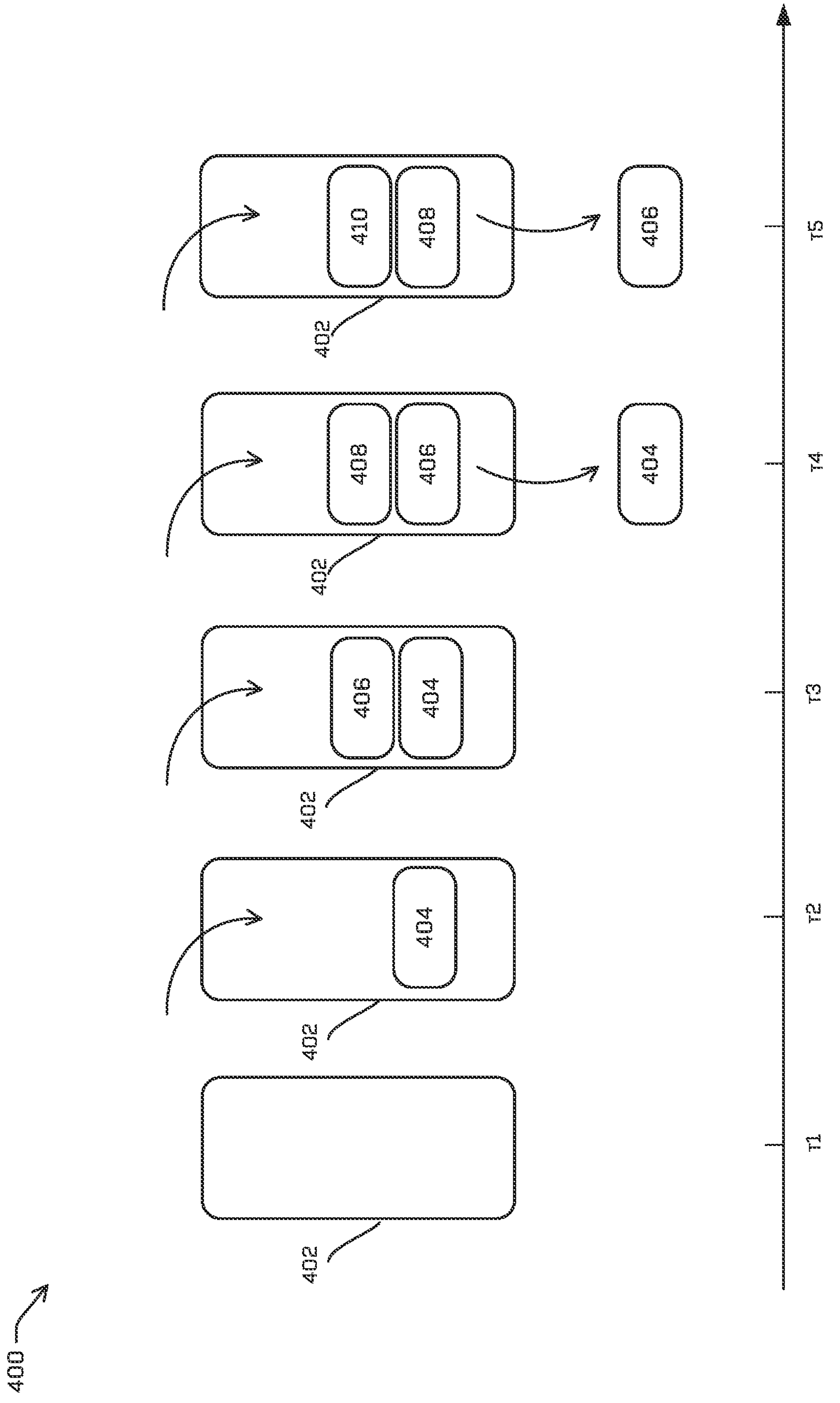
FIG. 4 depicts an example in which data are stored in a buffer component in a first-in-first-out (FIFO) manner.

FIG. 4 depicts an example 400 in which data are stored in a buffer component 402 in a first-in-first-out (FIFO) manner. In the FIFO manner, the latest data in the buffer will be retrieved first. In various examples, the buffer component 402 can be implemented as the buffer components described with respect to FIG. 1A, FIG. 1B, FIG. 2, and FIGS. 3A-3C. As described herein, the buffer component 402 can be used to store trajectory data associated with simulated agents in a simulation scenario. The trajectory data can include information regarding simulated agent behaviors (e.g., lane changes, right turn, left turn, speed adjustments, adjusting positions in a lane, when to yield, or the like), metrics (e.g., accelerations, velocities, yaw rates and/or yaw angles, following distances, lateral acceleration rates while turning, stopping locations, or the like), navigation decisions (e.g., how to perform route planning, which lane to use, the desired cruising speed, when to stop/re-route, or the like), or the like.

Additionally, the buffer component 402 can be used to store other data associated with a simulation scenario, such as agent state data, traffic data, weather data, or the like. Examples of agent state data can include information regarding agent type (e.g., train, car, truck, bicycle, pedestrian, or the like), agent size, agent shape, or the like. Examples of traffic data can include information regarding stop signs, speed limits, traffic lights, parking signs, or the like. Examples of weather data can include information regarding rainy weather, sunny weather, snowy weather, or the like.

In the illustrated example, at a first time point $t_1$, the buffer component 402 can be empty. In this example, at a second time point $t_2$, a first segment of data 404 can be stored in the buffer component 402. At a third time point $t_3$, a second segment of data 406 can be stored in the buffer component 402. At a fourth time point ta, the first segment of data 404 can be retrieved, and a third segment of data 408 can be stored in the buffer component 402. At a fifth time point $t_5$, the second segment of data 406 can be retrieved, and a forth segment of data 410 can be stored in the buffer component 402. As such, data are stored in the buffer component 402 in a first-in-first-out (FIFO) manner. In the first-in-first-out (FIFO) manner, the oldest data stored in the buffer component is retrieved first, while the newest data will be retrieved last. In an overwriting manner, the new data will replace the old data in the buffer component after the buffer component is full.

Though FIG. 4 shows that segments of data are popped out, the segments of data are not necessarily to be popped out. Instead, the buffer component 402 can be configured to store segments in order (e.g., in time order or the like), and overwrite the oldest segments.

Additionally or alternatively, the buffer component 402 can be configured to store data in other manners such as a first-in-last-out (FILO) manner, overwriting manner, or the like. In the FILO manner, the newest data (e.g., the third segment of data 408) stored in the buffer component 402 is retrieved first, while the oldest data (e.g., the first segment of data 404) will be retrieved last. In some examples, at each of the periodic time intervals, the oldest trajectory can be removed from the buffer component. Additionally or alternatively, the buffer component 402 can be configured as a ring buffer. As described herein, a ring buffer can be a data structure that is treated as circular although its implementation is linear.

Figure 5:
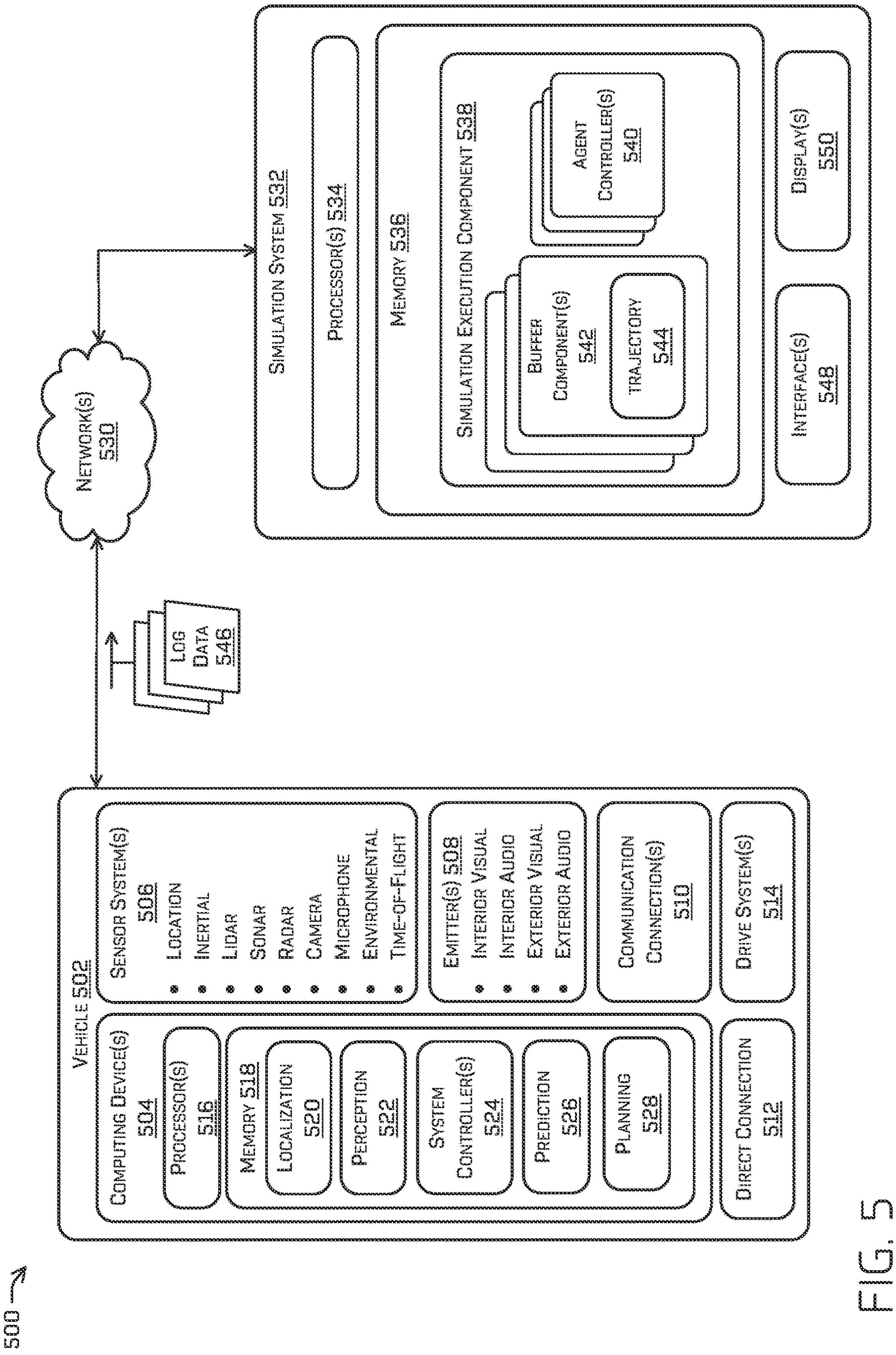
FIG. 5 illustrates an example computing environment that may be used to implement the driving simulation systems and techniques described herein.

FIG. 5 illustrates an example computing environment 500 that may be used to implement the driving simulation systems and techniques described herein. This computing environment 500 includes a vehicle 502 and a simulation system 532 configured to generate and execute driving simulations. The vehicle 502 may include various software-based and/or hardware-based components of an autonomous vehicle, and may be used to control autonomous vehicles traversing through physical environments and/or simulated vehicles operating within driving simulations. The vehicle 502 may be similar or identical to any or all of the real and/or simulated vehicles or controllers described herein. The simulation system 532 may be similar or identical to the simulation systems described above in reference to FIGS. 1-4. In some examples, the vehicle 502 may correspond to a vehicle traversing a physical environment, capturing and storing log data which may be provided to the simulation system 532 and used to generate simulations.

In at least one example, the vehicle 502 may correspond to an autonomous or semi-autonomous vehicle configured to perform object perception and prediction functionality, route planning, and/or optimization. The example vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more system controllers 524, a prediction component 526, and a planning component 528. Though depicted in FIG. 6 as residing in the memory 518 for illustrative purposes, one or more of the localization component 520, the perception component 522, the system controllers 524, the prediction component 526, and the planning component 528 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization, and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for determining that an object is proximate to one or more crosswalk regions and/or for identifying candidate reference lines, as discussed herein.

In some instances, and in general, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the memory 518 can include one or more maps that can be used by the vehicle 502 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed.

In some examples, the vehicle 502 can be controlled based at least in part on the maps. That is, the maps can be used in connection with the localization component 520, the perception component 522, the prediction component 526, and/or the planning component 528 to determine a location of the vehicle 502, identify objects in an environment, and/or generate routes and/or trajectories to navigate within an environment.

In at least one example, the vehicle computing device(s) 504 can include one or more system controllers 524, which can be configured to control steering, propulsion, braking, safety, emitters, communication, and other systems of the vehicle 502. The system controller(s) 524 can communicate with and/or control corresponding systems of the drive system(s) 514 and/or other components of the vehicle 502.

In general, the prediction component 526 can include functionality to generate predicted information associated with objects in an environment. As an example, the prediction component 526 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 526 can generate one or more predicted positions, predicted velocities, predicted trajectories, etc., for such target objects based on attributes of the target object and/or other objects proximate to the target object.

In general, the planning component 528 can determine a path for the vehicle 502 to follow to traverse the environment. For example, the planning component 528 can determine various routes and trajectories and various levels of detail. For example, the planning component 528 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 528 can generate one or more trajectories for the vehicle 502 based at least in part on predicted location(s) associated with object(s) in an environment. In some examples, the planning component 528 can use temporal logic, such as linear temporal logic and/or signal temporal logic, to evaluate one or more trajectories of the vehicle 502.

As can be understood, the components discussed herein (e.g., the localization component 520, the perception component 522, the one or more system controllers 524, the prediction component 526, and the planning component 528 are described as divided for illustrative purposes. However, the operations performed by the various components can be combined or performed in any other component. Further, any of the components discussed as being implemented in software can be implemented in hardware, and vice versa. Further, any functionality implemented in the vehicle 502 can be implemented in one or more remote computing device(s) (e.g., the simulation system 532), or another component (and vice versa).

In at least one example, the sensor system(s) 506 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the time of flight sensors can include the individual time of flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 530, to the one or more external computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 530. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more system controllers 524, the prediction component 526, and the planning component 528 can process sensor data, as described above, and can send their respective outputs as log data 546, over the one or more network(s) 530, to one or more external computing device(s), such as the simulation system 532. In at least one example, the respective outputs of the components can be transmitted to the simulation system 532 at a particular frequency, after a lapse of a predetermined period of time, in near real-time, etc. Additionally or alternatively, the vehicle 502 can send sensor data to the simulation system 532 via the network(s) 530, including raw sensor data, processed sensor data, and/or representations of sensor data. Such sensor data can be sent as one or more files of log data 544 to the simulation system 532 at a particular frequency, after a lapse of a predetermined period of time, in near real-time, etc.

The simulation system 532 may include one or more processors 534 and memory 536 communicatively coupled with the one or more processors 534. In the illustrated example, the memory 536 of the simulation system 532 stores a simulation execution component 538 configured to perform driving simulations. In some examples, the driving simulations can be performed based on driving log data 546 transmitted from real (non-simulated) vehicles operating in physical environments. In other examples, driving simulations may be generated based on synthetic scenarios created, ab initio, programmatically rather than based on log data from physical environments. The simulation execution component 538 may include one or more agent controllers 540 and one or more buffer components 542. The one or more agent controllers 540 can be configured to control one or more simulated agents during the driving simulation. The one or more buffer components 542 can be configured to store trajectories associated with one or more simulated agents during the driving simulation.

As described herein, the simulation execution component 538 may generate and execute driving simulations, during which the agent controller(s) 540 may be used to control the behavior characteristics of the simulated agents in the simulations. During the execution of a driving simulation, the simulation execution component 538 may execute a set of simulation instructions and generate simulation data. In some instances, the simulation execution component 538 can execute multiple simulated scenarios simultaneously and/or in parallel. This can allow users to edit simulations and execute permutations of the simulation with variations between each simulation, including reviewing and modifying the agent controller(s) 540 that control the behaviors of the simulated agents in the simulations.

As noted above, driving simulations may be performed in order to test and validate the performance of autonomous vehicle controllers, such as those operating on vehicle 502. Additionally or alternatively, the simulation execution component 538 may generate and run simulation(s) responsive to receiving an instruction or a request to validate (e.g., evaluate) an agent controller 540 and/or a set of operational scenarios.

The simulation execution component 538 may generate the simulation(s) utilizing the techniques described above, and described in the U.S. Patent Applications incorporated by reference above. In some examples, the simulation(s) may include at least two simulated vehicles (and/or other simulated agents) to simulate the agent integration with reaction delays.

In various examples, the simulation system 532 may include one or more input/output (I/O) devices, such as via one or more interfaces 548. The interface(s) 548 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi), and wired networks, as well as close-range communications such as Bluetooth®, Bluetooth® low energy, and the like, as additionally enumerated elsewhere herein.

In some examples, a user may view user interfaces associated with the simulation execution component 538, such as to input data and/or view results via one or more displays 550. Depending on the type of computing device, such as a user computing device, server computing device, or the like, the display 550 may employ any suitable display technology. For example, the display 550 may be a liquid crystal display, a plasma display, a light emitting diode display, an OLED (organic light-emitting diode) display, an electronic paper display, or any other suitable type of display able to present digital content thereon. In some examples, the display 550 may have a touch sensor associated with the display 550 to provide a touchscreen display configured to receive touch inputs for enabling interaction with a graphical user interface presented on the display 550. Accordingly, examples herein are not limited to any particular display technology.

The processor(s) 516 of the vehicle 502 and the processor(s) 534 of the simulation system 532 can be any suitable processor capable of executing instructions to process data and perform operations as described herein. By way of example and not limitation, the processor(s) 516 and 534 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 536 are examples of non-transitory computer-readable media. The memory 518 and 536 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 6:
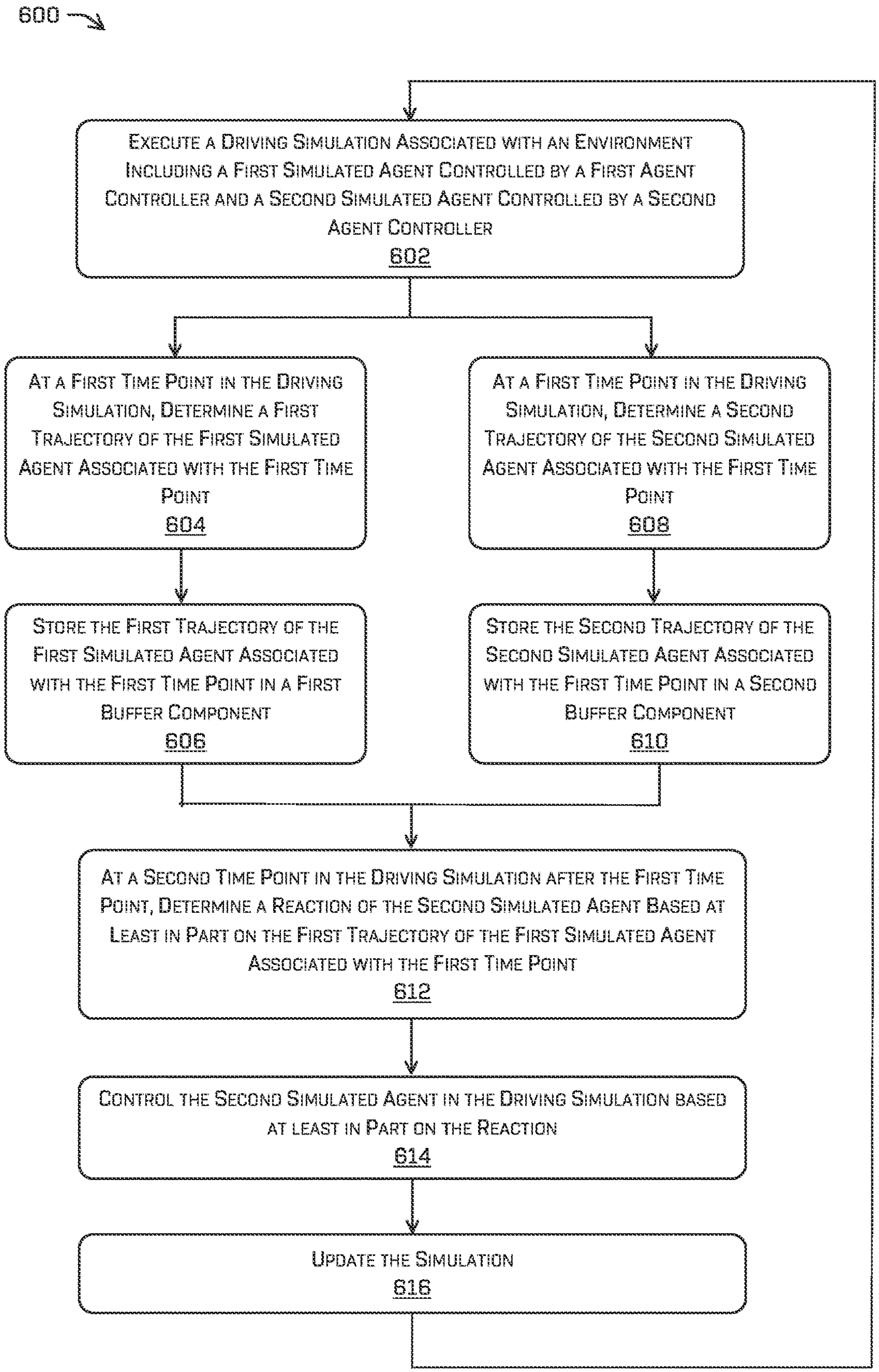
FIG. 6 is a flow diagram illustrating an example process of generating a driving simulation.

It should be noted that while FIG. 6 is illustrated as a distributed system, in alternative examples, components of the vehicle 502 can be associated with the simulation system 532, and/or components of the simulation system 532 can be associated with the vehicle 502. That is, the vehicle 502 can perform one or more of the functions associated with the simulation system 532, and vice versa. Further, aspects of the agent controller(s) 540 (and subcomponents thereof) can be performed on any of the devices or systems discussed herein.

FIG. 6 is a flow diagram illustrating an example process 600 of generating a driving simulation. In various examples, the operations of process 600 may be performed by one or more components of the simulation system 102 in FIG. 1A and FIG. 1B, the simulation system 202 in FIG. 2, the simulation system 302 in FIGS. 3A-3C, and/or the simulation system 532 in FIG. 5.

At operation 602, the simulation system executes a driving simulation associated with an environment including a first simulated agent controlled by a first agent controller and a second simulated agent controlled by a second agent controller. For example, the simulation system can generate a simulation scenario including objects such as static objects (e.g., buildings, bridges, signs, or the like), and/or simulated agents such as vehicles (e.g., cars, trucks, trains, or the like), pedestrians, bicyclists, or the like. The simulation scenario can also include map markers (e.g., lane lines, sidewalks, crosswalks, junctions, parking spaces, or the like), traffic signs (e.g., stop signs, speed limits, traffic lights, parking signs, or the like), road construction signs, or the like. The simulation scenario can also include different driving regions (e.g., different countries, cities, states, counties, etc.), different types of driving locations (e.g., rural, suburb, or city driving, highway driving, intersection with pedestrians, parking lot, school zone, construction zone, curved roads, hills, four-way stops, two-way stops, and the like), and/or different types of driving conditions (e.g., night driving, low-visibility driving, driving in rain or snow, etc.).

At operation 604, at a first time point in the driving simulation, the simulation system determines a first trajectory of the first simulated agent associated with the first time point. The first agent trajectories determined in operation 604 may include any movement or operation associated with the first simulated agent during the driving simulation. For example, first agent trajectories determined in operation 604 may include simulated agent behaviors (e.g., merging, accelerating, decelerating, stopping, turning left, turning right, making a U-turn, parking, etc.), metrics (e.g., velocity metrics, acceleration/deceleration metrics, following distance metrics, lateral acceleration metrics, stopping location metrics relative to stop signs, crosswalks, or other objects, etc.), driving/navigation decisions (e.g., selecting routes, determining destinations, making detours, using turn signals, etc.), and the like associated with the first simulated agents.

In various examples, the first agent trajectory may include simulated agent behaviors at a plurality of time points during the driving simulation. In some examples, the plurality of time points may include time points at a periodic interval.

At operation 606, the simulation system stores the first trajectory of the first simulated agent associated with the first time point in a first buffer component. As described herein, an individual buffer component is a region of memory used to temporarily store data. In some examples, the buffer component can be used to store data in various modes, such as a first-in-last-out (FILO) mode, a first-in-first-out (FIFO) mode, an overwriting mode, or the like.

At operation 608, at a first time point in the driving simulation, the simulation system determines a second trajectory of the second simulated agent associated with the first time point. The second agent trajectories determined in operation 608 may include any movement or operation associated with the second simulated agent during the driving simulation. For example, second agent trajectories determined in operation 608 may include simulated agent behaviors (e.g., merging, accelerating, decelerating, stopping, turning left, turning right, making a U-turn, parking, etc.), metrics (e.g., velocity metrics, acceleration/deceleration metrics, following distance metrics, lateral acceleration metrics, stopping location metrics relative to stop signs, crosswalks, or other objects, etc.), driving/navigation decisions (e.g., selecting routes, determining destinations, making detours, using turn signals, etc.), and the like associated with the second simulated agents.

In various examples, the second agent trajectory may include simulated agent behaviors at a plurality of time points during the driving simulation. In some examples, the plurality of time points may include time points at a periodic interval.

At operation 610, the simulation system stores the second trajectory of the second simulated agent associated with the first time point in a second buffer component. The second buffer component can be implemented in the same manner as the first buffer component.

At operation 612, at a second time point in the driving simulation after the first time point, the simulation system determines a reaction of the second simulated agent based at least in part on the first trajectory of the first simulated agent associated with the first time point. In various examples, the reaction may include simulated agent maneuvers such as accelerating, decelerating, stopping, turning left, turning right, merging, making a U-turn, parking, or the like. In various examples, the time period between the first time point and the second time point is a reaction delay. As noted above, by adding a reaction delay to the simulated agent reaction when executing the driving simulation, the simulation system can provide a driving simulation more human-like and realistic.

In various examples, the simulation system can determine a reaction delay for an individual simulated agent independently. For example, during the driving simulation, one simulated agent can have a relatively high reaction delay, and another simulated agent can have a relatively low reaction delay. In addition, the reaction delay for an individual simulated agent can vary over time. In some instances, the simulation system can dynamically adjust the reaction delay for an individual simulated agent based on driving regions (e.g., different countries, cities, states, counties, etc.), different types of driving locations (e.g., rural, suburb, or city driving, highway driving, intersection with pedestrians, parking lot, school zone, construction zone, curved roads, hills, four-way stops, two-way stops, and the like), and/or different types of driving conditions (e.g., night driving, low-visibility driving, driving in rain or snow, etc.). In some instances, the reaction delay can reflect a driver's attentiveness while driving. For example, when the simulated agent is operating on a busy road, the driver's attentiveness may be relatively high, and the reaction delay may be relatively low. On the other hand, when the simulated agent is operating on a boring road, the driver's attentiveness may be relatively low, and the reaction delay may be relatively high.

At operation 614, the simulation system controls the second simulated agent in the driving simulation based at least in part on the reaction. For example, at the second time point after the first time point, the simulation system may execute the second agent controller to control the second simulated agent to perform a reaction such as decelerating the second simulated agent to accommodate the first simulated agent in front of the second simulated agent. Additionally or alternatively, the reaction can be stopping the second simulated agent at a stopping point, changing lanes, etc.

At operation 616, the simulation system updates the simulation. In some examples, the simulation system can update the simulation periodically or based on triggers. For example, the simulation system can update the simulation every 0.1 seconds, every 0.5 seconds, or the like. As another example, the simulation system can update the simulation when a trigger event occurs (e.g., two simulated agents coming close, a simulated agent driving into a junction, a simulated agent driving to a turning point, a simulated agent making the reaction to another simulated agent, or the like).

EXAMPLE CLAUSES

Any of the example clauses in this section may be used with any other of the example clauses and/or any of the other examples or embodiments described herein.

A: A system comprising: one or more processors; and one or more non-transitory computer-readable media storing computer-executable instructions that, when executed, cause the system to perform operations comprising: executing a driving simulation associated with an environment, the driving simulation including an observed simulated agent controlled by a first agent controller and an observing simulated agent controlled by a second agent controller; at a first time point in the driving simulation, determining a first trajectory of the observed simulated agent associated with the first time point, and determining a second trajectory of the observing simulated agent associated with the first time point; storing the first trajectory of the observed simulated agent associated with the first time point in a first buffer component; storing the second trajectory of the observing simulated agent associated with the first time point in a second buffer component; at a second time point in the driving simulation after the first time point, determining, by the second agent controller, a reaction of the observing simulated agent based at least in part on the first trajectory of the observed simulated agent associated with the first time point, a time period between the first time point and the second time point being a reaction delay; and controlling, by the second agent controller, the observing simulated agent in the driving simulation based at least in part on the reaction.

B: The system of paragraph A, wherein: determining the first trajectory of the observed simulated agent associated with the first time point is performed by the first agent controller; determining the second trajectory of the observing simulated agent associated with the first time point is performed by the second agent controller; the operations further comprising: accessing the first trajectory in the first buffer component by the second agent controller; and accessing the second trajectory in the second buffer component by the first agent controller.

C: The system of paragraph A, the operations further comprising: determining, by the first agent controller, an updated first trajectory for the observed simulated agent at the second time point, wherein the updated first trajectory is different from the first trajectory; and controlling, by the first agent controller, the observed simulated agent based at least in part on the updated first trajectory.

D: The system of paragraph A, wherein the reaction delay includes at least one of a reaction time delay, a vehicle delay, or a distracted driver delay.

E: The system of paragraph A, wherein the first buffer component is further configured to store at least one of traffic signal data, observed simulated agent state data, or observing simulated agent state data.

F: A method comprising: executing a driving simulation, the driving simulation including a first simulated agent and a second simulated agent; storing a first trajectory of the first simulated agent associated with a first time point in the driving simulation; and controlling the second simulated agent, at a second time point in the driving simulation after the first time point, a time period between the first time point and the second time point being a reaction delay, wherein controlling the second simulated agent includes: retrieving the first trajectory of the first simulated agent associated with the first time point; and determining a second trajectory for controlling the second simulated agent, based at least in part on the first trajectory of the first simulated agent.

G: The method of paragraph F, wherein controlling the second simulated agent further comprises: determining a position of the first simulated agent at the second time point in the driving simulation, based at least in part on the first trajectory.

H: The method of paragraph G, wherein the reaction delay is determined based at least in part on behavior characteristics associated with the second simulated agent.

I: The method of paragraph F, wherein storing the first trajectory of the first simulated agent comprises storing the first trajectory of the first simulated agent at periodic time intervals during the driving simulation in a first buffer component in a first-in-first-out (FIFO) manner.

J: The method of paragraph I, further comprising storing the second trajectory of the second simulated agent at periodic time intervals during the driving simulation in a second buffer component.

K: The method of paragraph F, wherein determining the first trajectory of the second simulated agent associated with the first time point is performed by a first agent controller; the method further comprising: accessing the first trajectory in a buffer component by a second agent controller configured to control the second simulated agent.

L: The method of paragraph F, further comprising: determining, by a first agent controller, an updated first trajectory for the first simulated agent at the second time point, wherein the updated first trajectory is different from the first trajectory; and controlling, by a first agent controller, the first simulated agent based at least in part on the updated first trajectory.

M: The method of paragraph L, further comprising at the second time point, controlling the second simulated agent based at least in part on the first trajectory of the first simulated agent associated with the first time point.

N: The method of paragraph F, wherein the reaction delay is determined based at least in part on behavior characteristics associated with the second simulated agent.

O: One or more non transitory computer-readable media storing instructions executable by a processor, wherein the instructions, when executed, cause the processor to perform operations comprising: executing a driving simulation, the driving simulation including a first simulated agent and a second simulated agent; storing a first trajectory of the first simulated agent associated with a first time point in the driving simulation; and controlling the second simulated agent, at a second time point in the driving simulation after the first time point, a time period between the first time point and the second time point being a reaction delay, wherein controlling the second simulated agent includes: retrieving the first trajectory of the first simulated agent associated with the first time point; and determining a second trajectory for controlling the second simulated agent, based at least in part on the first trajectory of the first simulated agent.

P: The one or more non transitory computer-readable media of paragraph O, wherein controlling the second simulated agent further comprises: determining a position of the first simulated agent at the second time point in the driving simulation, based at least in part on the first trajectory.

Q: The one or more non transitory computer readable media of paragraph P, wherein the reaction delay is determined based at least in part on behavior characteristics associated with the second simulated agent.

R: The one or more non transitory computer-readable media of paragraph O, wherein storing the first trajectory of the first simulated agent comprises storing the first trajectory of the first simulated agent at periodic time intervals during the driving simulation in a first buffer component in a first-in-first-out (FIFO) manner.

S: The one or more non transitory computer-readable media of paragraph R, the operations further comprising storing the second trajectory of the second simulated agent at periodic time intervals during the driving simulation in a second buffer component.

T: The one or more non transitory computer-readable media of paragraph O, wherein determining the first trajectory of the second simulated agent associated with the first time point is performed by a first agent controller; the operations further comprising: accessing the first trajectory in a buffer component by a second agent controller configured to control the second simulated agent.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes, or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements, and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements, or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

executing a driving simulation associated with an environment, the driving simulation including an observed simulated agent controlled by a first agent controller and an observing simulated agent controlled by a second agent controller, wherein the driving simulation is associated with an autonomous vehicle controller;

at a first time point in the driving simulation, determining a first trajectory of the observed simulated agent associated with the first time point, and determining a second trajectory of the observing simulated agent associated with the first time point;

storing the first trajectory of the observed simulated agent associated with the first time point in a first buffer component;

storing the second trajectory of the observing simulated agent associated with the first time point in a second buffer component;

at a second time point in the driving simulation after the first time point, determining, by the second agent controller, a reaction of the observing simulated agent based at least in part on the first trajectory of the observed simulated agent associated with the first time point, a time period between the first time point and the second time point being a reaction delay;

controlling, by the second agent controller, the observing simulated agent in the driving simulation based at least in part on the reaction; and transmitting the autonomous vehicle controller to a vehicle based at least in part on an output of the driving simulation, wherein the vehicle is configured to use the autonomous vehicle controller to traverse a driving environment.

2. The system of claim 1, wherein:

determining the first trajectory of the observed simulated agent associated with the first time point is performed by the first agent controller;

determining the second trajectory of the observing simulated agent associated with the first time point is performed by the second agent controller; and the operations further comprising:

accessing the first trajectory in the first buffer component by the second agent controller; and accessing the second trajectory in the second buffer component by the first agent controller.

3. The system of claim 1, the operations further comprising:

determining, by the first agent controller, an updated first trajectory for the observed simulated agent at the second time point, wherein the updated first trajectory is different from the first trajectory; and controlling, by the first agent controller, the observed simulated agent based at least in part on the updated first trajectory.

4. The system of claim 1, wherein the reaction delay includes at least one of a reaction time delay, a vehicle delay, or a distracted driver delay.

5. The system of claim 1, wherein the first buffer component is further configured to store at least one of traffic signal data, observed simulated agent state data, or observing simulated agent state data.

6. A method comprising:

executing a driving simulation, the driving simulation including a first simulated agent and a second simulated agent, wherein the driving simulation is associated with a vehicle controller;

storing a first trajectory of the first simulated agent associated with a first time point in the driving simulation; and controlling the second simulated agent, at a second time point in the driving simulation after the first time point, a time period between the first time point and the second time point being a reaction delay, wherein controlling the second simulated agent includes:

retrieving the first trajectory of the first simulated agent associated with the first time point;

determining a second trajectory for controlling the second simulated agent, based at least in part on the first trajectory of the first simulated agent; and transmitting the vehicle controller to a vehicle based at least in part on an output of the driving simulation, wherein the vehicle is configured to use the vehicle controller to traverse a driving environment.

7. The method of claim 6, wherein controlling the second simulated agent further comprises:

determining a position of the first simulated agent at the second time point in the driving simulation, based at least in part on the first trajectory.

8. The method of claim 7, wherein the reaction delay is determined based at least in part on behavior characteristics associated with the second simulated agent.

9. The method of claim 6, wherein storing the first trajectory of the first simulated agent comprises storing the first trajectory of the first simulated agent at periodic time intervals during the driving simulation in a first buffer component in a first-in-first-out (FIFO) manner.

10. The method of claim 9, further comprising storing the second trajectory of the second simulated agent at periodic time intervals during the driving simulation in a second buffer component.

11. The method of claim 6, wherein determining the first trajectory of the second simulated agent associated with the first time point is performed by a first agent controller;

the method further comprising:

accessing the first trajectory in a buffer component by a second agent controller configured to control the second simulated agent.

12. The method of claim 6, further comprising:

determining, by a first agent controller, an updated first trajectory for the first simulated agent at the second time point, wherein the updated first trajectory is different from the first trajectory; and controlling, by a first agent controller, the first simulated agent based at least in part on the updated first trajectory.

13. The method of claim 12, further comprising:

at the second time point, controlling the second simulated agent based at least in part on the first trajectory of the first simulated agent associated with the first time point.

14. The method of claim 6, wherein the reaction delay is determined based at least in part on behavior characteristics associated with the second simulated agent.

15. One or more non-transitory computer-readable media storing instructions executable by a processor, wherein the instructions, when executed, cause the processor to perform operations comprising:

executing a driving simulation, the driving simulation including a first simulated agent and a second simulated agent, wherein the driving simulation is associated with a vehicle controller;

storing a first trajectory of the first simulated agent associated with a first time point in the driving simulation; and controlling the second simulated agent, at a second time point in the driving simulation after the first time point, a time period between the first time point and the second time point being a reaction delay, wherein controlling the second simulated agent includes:

retrieving the first trajectory of the first simulated agent associated with the first time point;

determining a second trajectory for controlling the second simulated agent, based at least in part on the first trajectory of the first simulated agent; and transmitting the vehicle controller to a vehicle based at least in part on an output of the driving simulation, wherein the vehicle is configured to use the vehicle controller to traverse a driving environment.

16. The one or more non-transitory computer-readable media of claim 15, wherein controlling the second simulated agent further comprises:

determining a position of the first simulated agent at the second time point in the driving simulation, based at least in part on the first trajectory.

17. The one or more non-transitory computer-readable media of claim 16, wherein the reaction delay is determined based at least in part on behavior characteristics associated with the second simulated agent.

18. The one or more non-transitory computer-readable media of claim 15, wherein storing the first trajectory of the first simulated agent comprises storing the first trajectory of the first simulated agent at periodic time intervals during the driving simulation in a first buffer component in a first-in-first-out (FIFO) manner.

19. The one or more non-transitory computer-readable media of claim 18, the operations further comprising storing the second trajectory of the second simulated agent at periodic time intervals during the driving simulation in a second buffer component.

20. The one or more non-transitory computer-readable media of claim 15, wherein determining the first trajectory of the second simulated agent associated with the first time point is performed by a first agent controller;

the operations further comprising:

accessing the first trajectory in a buffer component by a second agent controller configured to control the second simulated agent.

* * * * *